US012560889B2

(12) United States Patent
Ozaki et al.

(10) Patent No.: US 12,560,889 B2
(45) **Date of Patent: *Feb. 24, 2026**

(54) IMAGE FORMING APPARATUS AND PROCESS CARTRIDGE

(71) Applicant: CANON KABUSHIKI KAISHA, Tokyo (JP)

(72) Inventors: Goshi Ozaki, Kanagawa (JP); Ryota Shibuya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,031

(22) Filed: Mar. 25, 2024

(65) Prior Publication Data

US 2024/0231271 A1 Jul. 11, 2024

Related U.S. Application Data

(60) Division of application No. 18/200,030, filed on May 22, 2023, now Pat. No. 11,966,193, which is a (Continued)

(30) Foreign Application Priority Data

Sep. 30, 2019 (JP) ................................ 2019-180285

(51) Int. Cl.
*G03G 21/18* (2006.01)

(52) U.S. Cl.
CPC ................................ *G03G 21/1857* (2013.01)

(58) Field of Classification Search
CPC .................................................. G03G 21/1857
See application file for complete search history.

(56) References Cited

U.S. PATENT DOCUMENTS 9,846,409 B2 * 12/2017 Cao .................... G03G 21/1857
11,199,807 B2 * 12/2021 Kamoshida ........ G03G 21/1676
(Continued)

FOREIGN PATENT DOCUMENTS

JP 2005-114159 A 4/2005
JP 2017-223952 A 12/2017
(Continued)

OTHER PUBLICATIONS

International Search Report and Written Opinion for International Patent Application No. PCT/JP2020/037674.
(Continued)

*Primary Examiner* — Francis C Gray
(74) *Attorney, Agent, or Firm* — Venable LLP

(57) ABSTRACT

A cartridge includes a photosensitive drum, a development roller, a cartridge side gear, a movable member and a restricting portion. The cartridge is constituted such that when the cartridge side gear and a drive transmission member of a main assembly of an image forming apparatus are engaged with each other, the drive transmission member and a cover covering the drive transmission member is accommodated in a space surrounded by the restricting portion, the movable member and the cartridge side gear. the space includes, in a range downstream of the restricting portion and upstream of the cartridge side gear, a region in which a distance from the axis of the photosensitive drum exceeds Ra which is a distance from the axis of the photosensitive drum to the restricting portion. The cartridge is structured to accommodate the cover in the region.

10 Claims, 25 Drawing Sheets

Related U.S. Application Data division of application No. 17/708,347, filed on Mar. 30, 2022, now Pat. No. 11,693,356, which is a continuation of application No. PCT/JP2020/037674, filed on Sep. 28, 2020.

(56) References Cited

U.S. PATENT DOCUMENTS

| | | | | |
|---|---|---|---|---|
| 11,966,193 | B2 * | 4/2024 | Ozaki | G03G 21/1857 |
| 2005/0111882 | A1 | 5/2005 | Sudo et al. | |
| 2008/0240796 | A1 * | 10/2008 | Morioka | G03G 21/1647 399/279 |
| 2008/0260428 | A1 * | 10/2008 | Ueno | G03G 21/186 399/167 |
| 2013/0051849 | A1 * | 2/2013 | Itabashi | G03G 21/1821 399/119 |
| 2014/0140745 | A1 | 5/2014 | Choi et al. | |
| 2016/0202631 | A1 * | 7/2016 | Itabashi | G03G 21/1857 399/262 |
| 2018/0239299 | A1 * | 8/2018 | Zhou | G03G 21/1853 |
| 2019/0094799 | A1 | 3/2019 | Umenai et al. | |
| 2019/0129356 | A1 | 5/2019 | Murakami et al. | |
| 2020/0301352 | A1 | 9/2020 | Matsumaru et al. | |
| 2021/0382434 | A1 * | 12/2021 | Morioka | G03G 15/757 |
| 2022/0035307 | A1 | 2/2022 | Munetsugu et al. | |
| 2022/0075312 | A1 | 3/2022 | Ozaki et al. | |
| 2023/0297025 | A1 * | 9/2023 | Ozaki | G03G 21/1857 399/111 |

FOREIGN PATENT DOCUMENTS

| | | | |
|---|---|---|---|
| JP | 2019-060997 | A | 4/2019 |
| TW | 2018/07519 | A | 3/2018 |
| WO | 2019/117317 | A1 | 6/2019 |

OTHER PUBLICATIONS

Dec. 26, 2022 Office Action in Taiwanese Patent Application No. 109133798.

Sep. 19, 2023 Office Action in Japanese Patent Application No. 2019-180285 (with Engish translation).

* cited by examiner (a)

(b)

(a)

(b)

IMAGE FORMING APPARATUS AND PROCESS CARTRIDGE

FIELD OF THE INVENTION

The present invention relates to a cartridge and an image forming apparatus using the cartridge.

Here, the cartridge is a unit which can be mounted to and dismounted from the main assembly of the image forming apparatus. An example thereof is a process cartridge. The process cartridge is a cartridge in which a photosensitive member and a process means actable on the photosensitive member are integrally formed into a cartridge and dismountably mounted to the main assembly of the electrophotographic image forming apparatus.

For example, a photosensitive member and at least one of a developing means, a charging means, and a cleaning means as the process means are integrally formed into a cartridge. Further, the image forming apparatus in the present application is an electrophotographic image forming apparatus which forms an image on a recording material by using an electrophotographic image forming method.

Examples of the electrophotographic image forming apparatus include, an electrophotographic copying apparatus, an electrophotographic printer (LED printer, laser beam printer, and so on), a facsimile machine, a word processor, and the like, for example.

In an electrophotographic image forming apparatus (hereinafter, also simply referred to as "image forming apparatus"), an electrophotographic photosensitive member, which is generally a drum type as an image bearing member, that is, a photosensitive drum (electrophotographic photosensitive drum) is uniformly charged electrically. Next, an electrostatic latent image (electrostatic image) is formed on the photosensitive member drum by selectively exposing the charged photosensitive member drum. Then, the electrostatic latent image formed on the photosensitive member drum is developed into a toner image with toner as a developer. Subsequently, the toner image formed on the photosensitive member drum is transferred onto a recording material such as recording sheet or a plastic sheet, and heat and/or pressure is applied to the toner image transferred on the recording material to record the toner image to fix the toner image on the recording material, thus performing the image recording.

BACKGROUND ART

Such an image forming apparatus ordinarily requires toner replenishment and maintenance of various process means. In order to facilitate this toner replenishment and maintenance, the photosensitive member drum, the charging means, the developing means, the cleaning means, and so on are all contained in a frame to form them into a cartridge, that is, a process cartridge which can be mounted to and dismounted from the image forming apparatus main assembly has been put into practical use.

According to this process cartridge method, a part of the maintenance of the apparatus can be performed by the user himself/herself without relying on the service person in charge of after-sales service. Therefore, the operability of the apparatus can be remarkably improved, and an image forming apparatus having excellent usability can be provided. Therefore, this process cartridge system is widely used for an image forming apparatus.

Further, as for the above-mentioned image forming apparatus and cartridge, those described in a Patent Document are known. That is, International Publication No. 2019/117317 discloses a structure in which a movable member provided in a process cartridge controls an inclination angle of an inclinable drive transmission member and connects the drive transmission member to the cartridge.

SUMMARY OF THE INVENTION

Problem to be Solved

The object of the present invention is to further improve the above-mentioned conventional structure.

Means for Solving the Problem

A typical structure disclosed in the present application is, a cartridge mountable to and dismountable from a main assembly of an image forming apparatus, said main assembly including a tiltable drive transmission member and a cover covering the drive transmission member, and the cartridge comprising:

- a photosensitive drum;
- a development roller;
- a cartridge side gear configured to engage with a gear portion provided at an outer peripheral surface of the drive transmission member;
- a movable member configured to move the gear portion of the drive transmission member to a position in which it is capable of engaging with the cartridge side gear; and
- a restricting portion for suppressing inclination of the drive transmission member when the gear portion of the drive transmission member rotates in a state that the gear portion of the drive transmission member is in engagement with the cartridge side gear,
- wherein a space surrounded by the restricting portion, the movable member and the cartridge side gear is configured to accommodate the drive transmission member and the cover when the drive transmission member and the cartridge side gear are in engagement with each other,
- wherein when Ra is a distance from an axis of the photosensitive drum to the restricting portion measured in a direction perpendicular to the axis of the photosensitive drum, the space includes a region which is away from the axis of the photosensitive drum by a distance, measured in a direction perpendicular to the axis of the photosensitive drum, which exceeds the distance Ra, the region being in a range downstream of the restricting portion and upstream of the cartridge side gear in a rotational moving direction of the photosensitive drum during an image forming operation, and
- wherein the region of the space is configured to accommodate the cover therein.

Other typical structures disclosed in the present application is, a cartridge comprising:

- a photosensitive drum;
- a development roller;
- a gear at least a part of which is uncovered;
- a movable member movable relative to the photosensitive drum;
- a first frame supporting the photosensitive drum; and
- a second frame supporting the development roller,
- wherein the movable member and the gear are positioned on one side of the cartridge in an axial direction of the photosensitive drum, wherein the first frame includes a projecting portion projecting outward in the axial direction on the one side of the cartridge, wherein in a pole coordinate system in a plane perpendicular to the axis, the pole coordinate system having a point of origin on the axis of the photosensitive drum, a ground line extending from the point of origin toward an axis of the gear, and a positive direction of an angle coordinate Θ in a rotational moving direction of the photosensitive drum during image forming operation, when R1 is a distance from the axis of the photosensitive drum to an addendum of the gear, and R2 is a distance from the axis of the photosensitive drum to the axis of the gear, (i) when the movable member is in a predetermined position, on the one side of the cartridge, a space including a region surrounded by a circle having a center on the axis of the photosensitive drum and the radius R1 are provided so as to be surrounded by the gear, the projecting portion and the movable member, (ii) in a range of the angle coordinate satisfying 190°<Θ<280° in the pole coordinate system, a shortest distance from the axis of the photosensitive drum and the projecting portion is Ra, (iii) the shortest distance Ra satisfies R1<Ra<R2, and (iv) in a region downstream of the part of the projecting portion and upstream of the gear, the space includes a region having a distance from the axis of the photosensitive drum exceeding Ra.

Furthermore another typical structure disclosed in the present application is, a cartridge comprising:

a photosensitive drum;

a development roller;

a gear at least a part of which is uncovered;

a movable member movable relative to the photosensitive drum; and a frame supporting the photosensitive drum and the development roller, wherein the movable member, the drum coupling and the gear are positioned on one side of the cartridge in an axial direction of the photosensitive drum, wherein the frame includes a first projecting portion and a second projecting portion projecting in a direction of an axis of the photosensitive drum, on one side of the cartridge, wherein the second guide projecting portion is positioned downstream of the first projecting portion and the upstream of the gear in a rotational moving direction of the photosensitive drum during image forming operation, wherein the second guide projecting portion is provided at a position more remote from the axis of the photosensitive drum than the first projecting portion, wherein in a pole coordinate system in a plane perpendicular to the axis, the pole coordinate system having a point of origin on the axis of the photosensitive drum, a ground line extending from the point of origin toward an axis of the gear, and a positive direction of an angle coordinate Θ in a rotational moving direction of the photosensitive drum during image forming operation, when R1 is a distance from the axis of the photosensitive drum to an addendum of the gear, and R2 is a distance from the axis of the photosensitive drum to the axis of the gear, wherein the first projected portion is positioned in the range satisfying 190°<Θ<280° in the pole coordinate system, and a distance Ra from the axis of the photosensitive drum satisfies R1<Ra<R2, and when the movable member is in a predetermined position, on the one side of the cartridge, a space including a region surrounded by a circle having a center on the axis of the photosensitive drum and the radius R1 are provided so as to be surrounded by the gear, the projecting portion and the movable member.

Another typical structure according to the present application is, a cartridge comprising:

a photosensitive drum;

a development roller;

a gear at least a part of which is uncovered;

a movable member movable relative to the photosensitive drum; and a frame supporting the photosensitive drum and the development roller, wherein the movable member, the drum coupling and the gear are positioned on one side of the cartridge in an axial direction of the photosensitive drum, wherein in a pole coordinate system in a plane perpendicular to the axis, the pole coordinate system having a point of origin on the axis of the photosensitive drum, a ground line extending from the point of origin toward an axis of the gear, and a positive direction of an angle coordinate Θ in a rotational moving direction of the photosensitive drum during image forming operation, when R1 is a distance from the axis of the photosensitive drum to an addendum of the gear, and R2 is a distance from the axis of the photosensitive drum to the axis of the gear, (i) the frame is provided with a projecting portion projecting in a direction of the axis of the photosensitive drum in a range satisfying 190°<Θ<280°, (ii) the frame includes a region in which no part of the projecting portion exists, in a range downstream of the projecting portion and upstream of the gear in the rotational moving direction of the photosensitive drum, (iii) a distance Ra from the axis of the photosensitive drum to the projecting portion satisfies R1<Ra<R2, and (iv) when the movable member is in a predetermined position, on the one side of the cartridge, a space including a region surrounded by a circle having a center on the axis of the photosensitive drum and the radius R1 are provided so as to be surrounded by the gear, the projecting portion and the movable member.

Further typical structure disclosed in this application is an image forming apparatus including any of the above cartridges.

Effect of the Invention

According to the present invention, the conventional structure can be improved.

EMBODIMENTS

Embodiment 1

Hereinafter, Embodiments of the present invention will be described in detail with reference to the accompanying drawings.

The direction of a rotation axis of an electrophotographic photosensitive drum is a longitudinal direction.

Further, in the longitudinal direction, the side on which the electrophotographic photosensitive drum receives the driving force from the image forming apparatus main assembly is the driving side, and the opposite side is the non-driving side.

Figure 1:
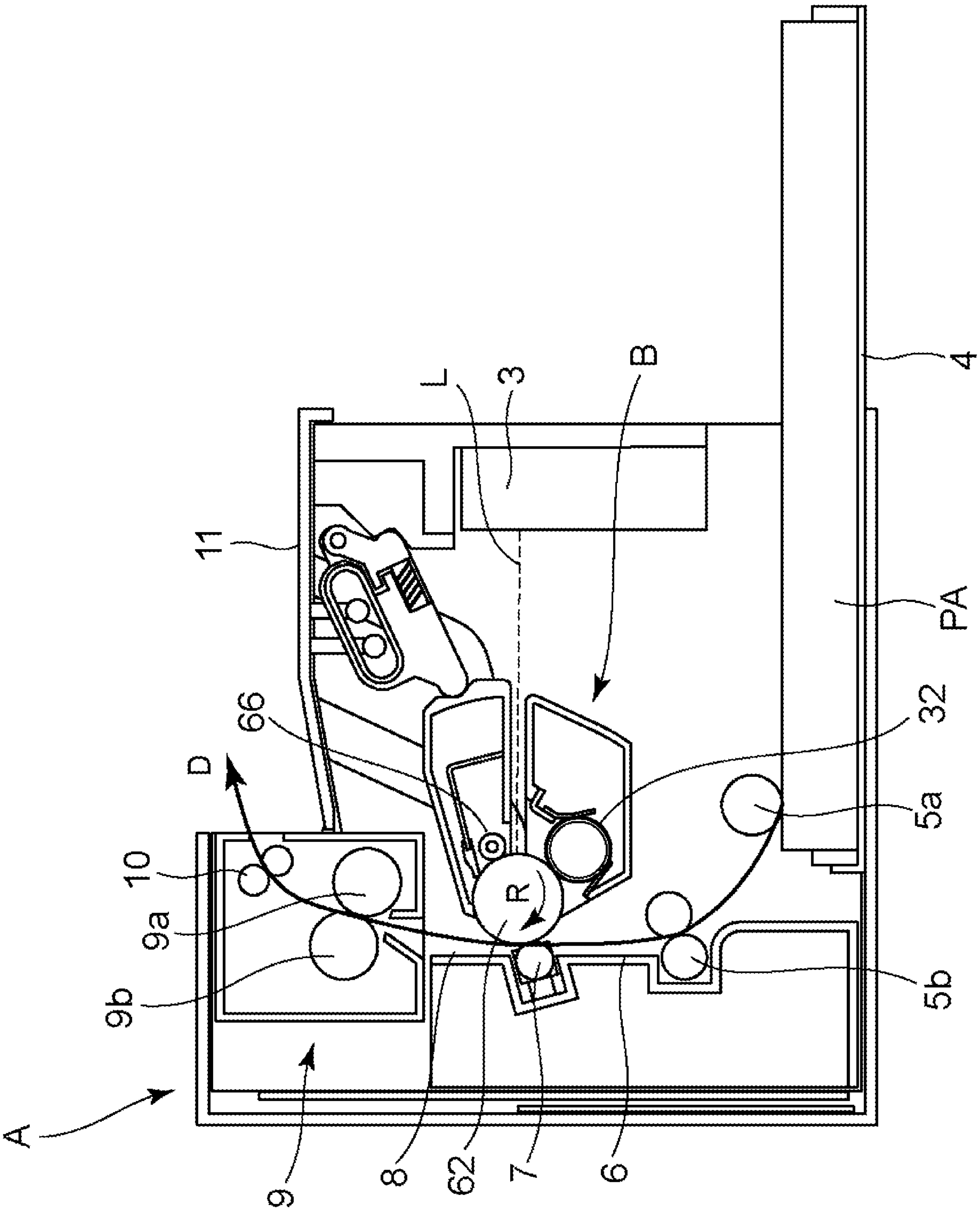
FIG. 1 is a cross-sectional view of an apparatus main assembly and a cartridge of the image forming apparatus according to the Embodiment 1.
Figure 2:
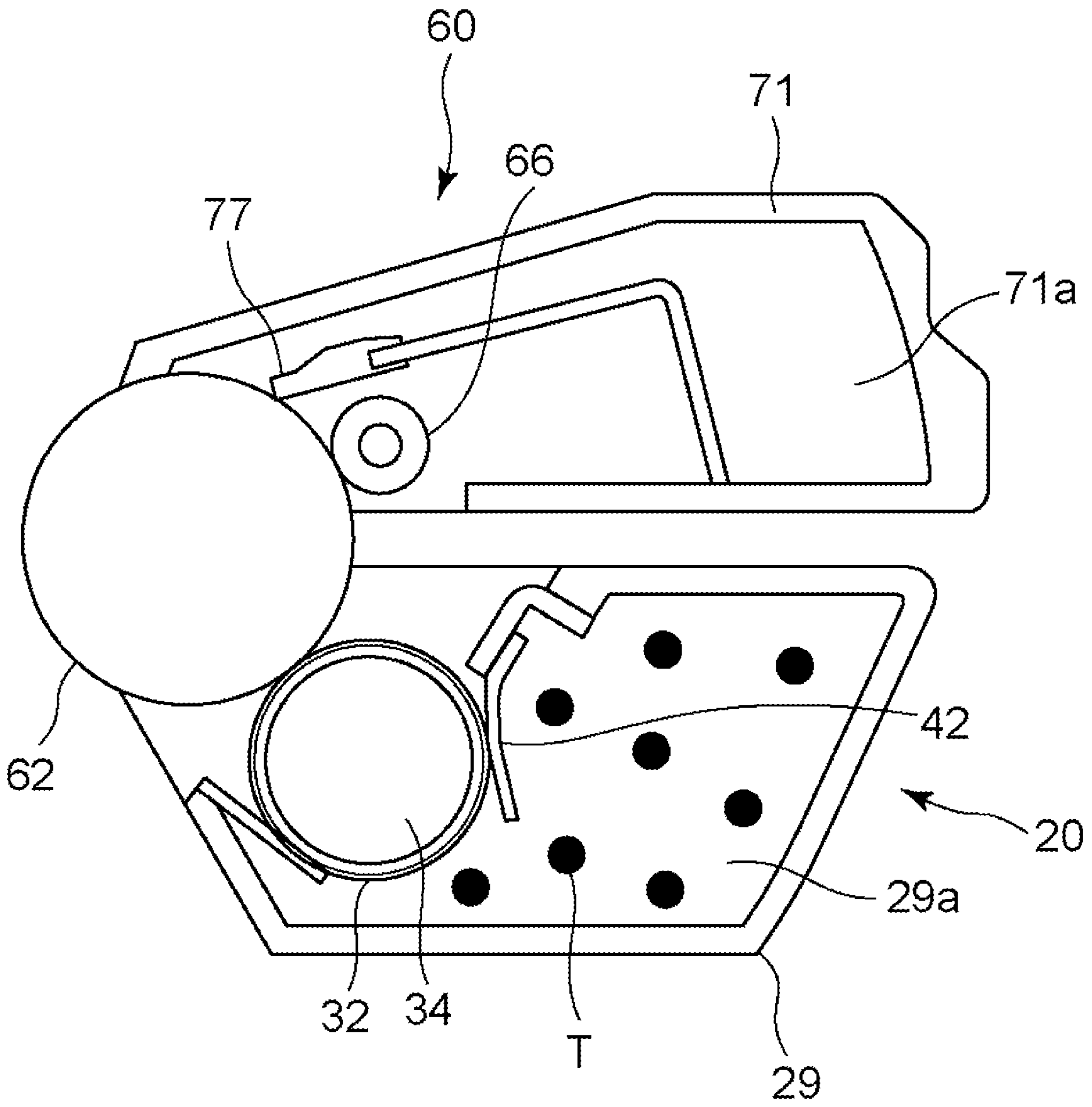
FIG. 2 is a cross-sectional view of the cartridge according to the Embodiment 1.

Referring to FIGS. 1 and 2, the overall structure and the image formation process will be described.

FIG. 1 is a sectional view of an apparatus main assembly (electrophotographic image forming apparatus main assembly, image forming apparatus main assembly) A and a process cartridge (hereinafter, referred to as cartridge B) of the electrophotographic image forming apparatus according to the Embodiment 1.

FIG. 2 is a cross-sectional view of the cartridge B.

Here, the apparatus main assembly A is a portion of the electrophotographic image forming apparatus excluding the cartridge B.

<Overall Structure of Image Forming Apparatus>

The electrophotographic image forming apparatus (image forming apparatus) shown in FIG. 1 is a laser beam printer using an electrophotographic process in which a cartridge B is mountable to and dismountable from the apparatus main assembly A. There is provided an exposure device 3 (laser scanner unit) for forming a latent image on the electrophotographic photosensitive drum 62 as an image bearing member of the cartridge B when the cartridge B is mounted to the apparatus main assembly A. Further, a sheet tray 4 containing a recording material (hereinafter referred to as a sheet material PA) on which the image is formed is provided under the cartridge B. The electrophotographic photosensitive drum 62 is a photosensitive member (electrophotographic photosensitive member) used for forming an electrophotographic image.

Further, the apparatus main assembly A includes a pickup roller 5*a*, a feeding roller pair 5*b*, a transfer guide 6, a transfer roller 7, a feeding guide 8, a fixing device 9, and a discharge roller pair 10, a discharge trays 11 and the like which are arranged in the order named along the feed direction D of the sheet material PA. The fixing device 9 comprises a heating roller 9*a* and a pressure roller 9*b*.

<Image Forming Process>

Next, the outline of the image formation process will be described. On the basis of a print start signal, the electrophotographic photosensitive drum (hereinafter, referred to as the photosensitive drum 62 or simply the drum 62) is rotationally driven in the arrow R direction at a predetermined peripheral speed (process speed).

A charging roller (charging member) 66 to which a bias voltage is applied contacts the outer peripheral surface of the drum 62 and uniformly charges the outer peripheral surface of the drum 62.

As shown in FIG. 2, the drum 62 is rotatably supported by a cleaning frame 71. The charging roller 66 and a cleaning blade 77 are supported on the cleaning frame 71.

The exposure device 3 outputs the laser beam L in accordance with the image information. The laser beam L passes through a laser aperture provided in the cartridge B and scanningly exposes the outer peripheral surface of the drum 62. By this, an electrostatic latent image corresponding to the image information is formed on the outer peripheral surface of the drum 62.

On the other hand, as shown in FIG. 2, in the developing unit 20 as a developing device, the toner T contained in the toner chamber 29*a* formed inside the developing frame 29 is supported on the surface of the developing roller 32 produced by the magnetic force of the magnet roller 34 (fixed magnet). The developing roller 32 is a developer carrying member which carries the developer (toner T) on the surface thereof in order to develop the latent image formed on the drum 62.

The developing roller 32 is rotatably supported by the developing frame and rotates in the direction of arrow R2 in FIG. 2 when an image is formed. With this rotation, the toner T carried on the surface of the developing roller 32 is triboelectrically charged by the developing blade 42, and a layer thickness of the toner on the peripheral surface of the developing roller 32 is restricted to a constant thickness.

The toner T is supplied to the drum 62 in accordance with the electrostatic latent image, thus developing the latent image. By this, the latent image is visualized into a toner image. The drum 62 is an image bearing member which carries a latent image or an image formed of toner (toner image, developer image) on the surface thereof. Further, as shown in FIG. 1, the sheet material PA stored in the lower portion of the apparatus main assembly A is fed out of the sheet tray 4 by the pickup roller 5*a* and the feeding roller pair 5*b* in timed relation with to an output timing of the laser beam L. Then, the sheet material PA is fed to the transfer position between the drum 62 and the transfer roller 7 by way of the transfer guide 6. At this transfer position, the toner image is sequentially transferred from the drum 62 to the sheet material PA.

The sheet material PA onto which the toner image is transferred is separated from the drum 62 and fed to the fixing device 9 along the feeding guide 8. Then, the sheet material PA passes through a nip portion provided between the heating roller 9*a* and the pressure roller 9*b* which constitute the fixing device 9. In this nip portion, pressure/heat fixing process is performed, so that the toner image is fixed on the sheet material PA. The sheet material PA which has been subjected to the toner image fixing process is fed to the discharge roller pair 10 and discharged to the discharge tray 11.

On the other hand, as shown in FIG. 2, the drum 62 after the image transfer is used again in the image forming process after residual toner on the outer peripheral surface thereof is removed by the cleaning blade 77. The toner removed from the drum 62 is stored in a waste toner chamber 71*a* provided inside the cleaning frame 71.

In the forgoing description, the charging roller 66, the developing roller 32, the transfer roller 7, and the cleaning blade 77 are process means for acting on the drum 62.

Of these means, the charging roller and the cleaning blade 77 are supported by the cleaning frame together with the photosensitive drum 62. Further, the developing roller 32 is supported by the developing frame 29. The cleaning frame 71, the members such as the photosensitive drum 62 supported by the cleaning frame 71 as a whole is referred to as a cleaning unit 60. Further, the developing frame 29 and the members such as the developing roller 32 and the developing blade 42 supported by the developing frame 29 as a whole are referred to as a developing unit 20. The cartridge B of this embodiment includes a cleaning unit 60 and a developing unit 20 connected to the cleaning unit 60.

One of the cleaning frame 71 and the developing frame 29 may be referred to as a first frame (first casing), and the other may be referred to as a second frame (casing). Further, the cleaning frame 71 and the developing frame 29 may be collectively referred to as a cartridge frame (casing).

<State in which Opening/Closing Door of the Apparatus Main Assembly is Open>

Next, the mounting of the cartridge will be specifically described.

Figure 3:
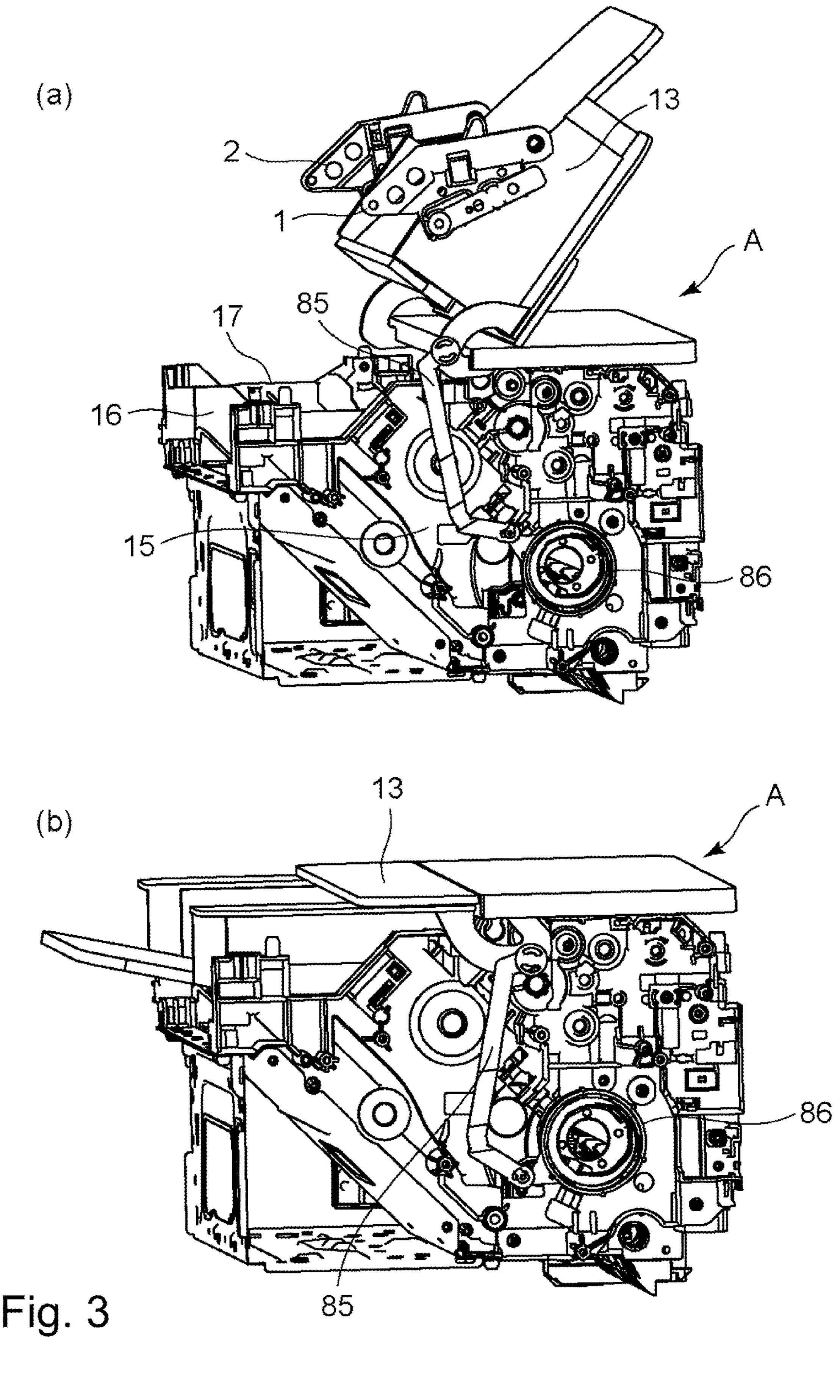
FIG. 3 is a perspective view of the image forming apparatus in opened/closed states of an opening/closing door according to the Embodiment 1.
Figure 4:
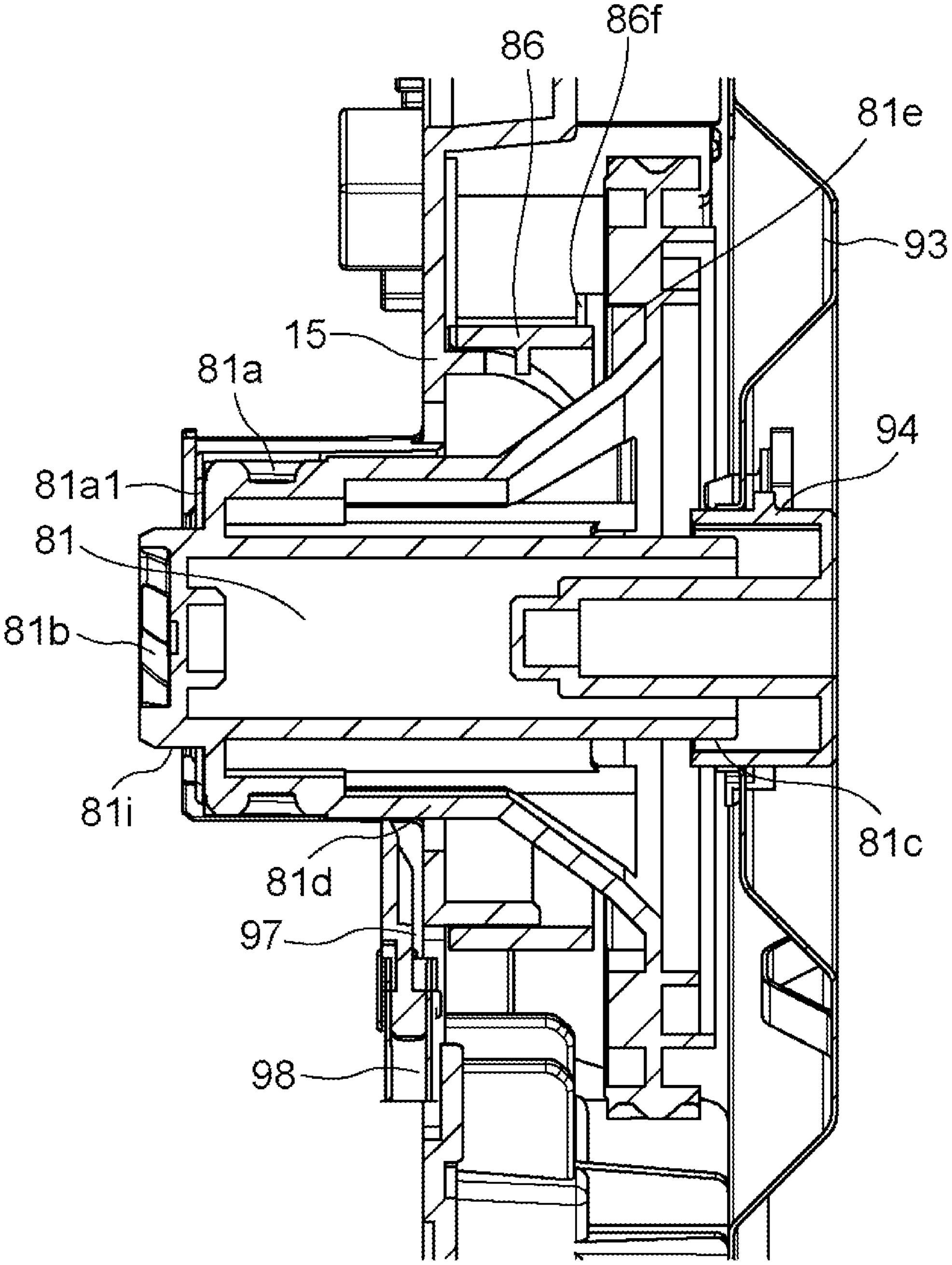
FIG. 4 is a sectional view of the drive transmission member in a state that the opening/closing door according to the Embodiment 1 is closed.

First, the structure and operation from the open state to the closed state of the opening/closing door 13 of the apparatus main assembly A will be described. Part (a) of FIG. 3 is a perspective view of the main assembly of the apparatus with the opening/closing door open, and part (b) of FIG. 3 is a perspective view of the main assembly of the apparatus with the opening/closing door closed. FIG. 4 is a sectional view of the drive transmission member with the opening/closing door closed.

As shown in FIG. 3, the apparatus main assembly A is provided with the opening/closing door 13, a cylindrical cam link 85, a cylindrical cam 86, and cartridge pressing members 1 and 2 including pressing springs on the driving side and the non-driving side, respectively. Further, the apparatus main assembly A includes a first side plate 15 provided on the driving side and a side plate 16 provided on the non-driving side. Further, as shown in FIG. 4, the apparatus main assembly A is provided with a drive transmission member 81 and a bearing 94 for the drive transmission member. A second side plate 93 is provided on the driving side of the apparatus main assembly A, and the bearing 94 is mounted to the second side plate 93.

The opening/closing door 13 is an opening/closing member for opening/closing a mounting portion (space for accommodating the cartridge) for mounting the cartridge B. The opening/closing door 13 is rotatably mounted on the first side plate 15 and the side plate 16. The cartridge B is inserted through a cartridge insertion slot 17 in a state that the opening/closing door 13 of the apparatus main assembly A is open.

Figure 5:
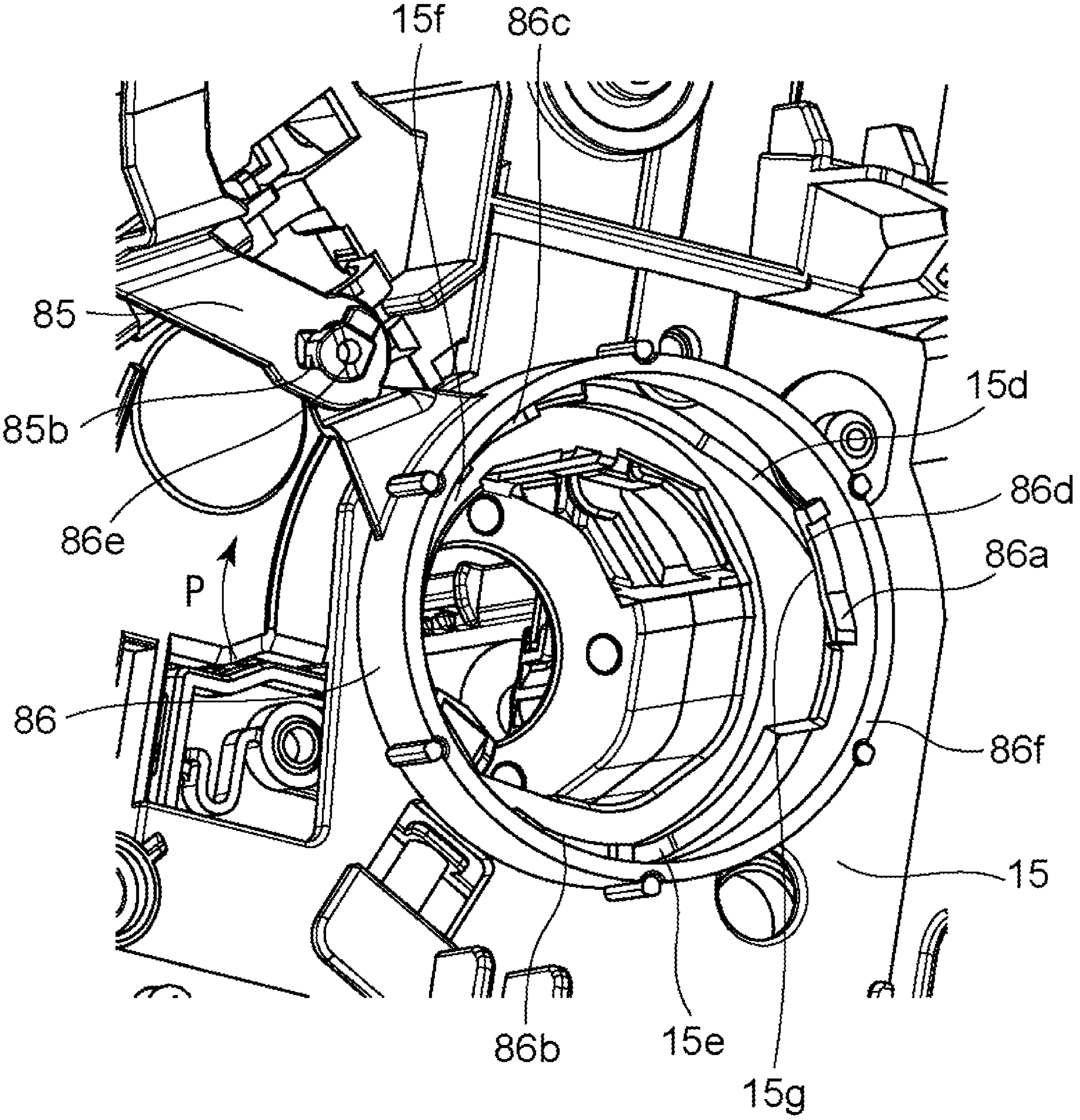
FIG. 5 is a perspective view of the neighborhood of a cylindrical cam with the opening/closing door opened according to the Embodiment 1.

FIG. 5 is a perspective view of the neighborhood of the cylindrical cam with the opening/closing door open. The cylindrical cam 86 is rotatably and movably mounted to the first side plate 15 and has three slopes 86*a*, 86*b*, 86*c*, one end portion 86*d* on the non-driving side in the longitudinal direction continuous with the slope. The first side plate 15 has three slope portions 15*d*, 15*e*, 15*f* facing the three slope portions 86*a*, 86*b*, 86*c*, and has an end surface 15*g* facing the one end portion 86*d* of the cylindrical cam 86. As shown in FIG. 5, the boss 86*e* provided on the cylindrical cam 86 and the mounting hole 85*b* provided on the cylindrical cam link 85 are rotatably mounted. In addition, a boss 85*a* provided at the other end of the cylindrical cam link 85 and a mounting hole 13*a* provided in the opening/closing door 13 are rotatably mounted.

When the opening/closing door 13 is rotated and opened, the cylindrical cam link 85 moves in interrelation with the opening/closing door 13. The movement of the cylindrical cam link 85 causes the cylindrical cam 86 to rotate clockwise direction P. When the cylindrical cam 86 rotates, the slope portions 86*a*, 86*b*, 86*c* slide along the slope portions 15*d*, 15*e*, 15*f*, so that the cylindrical cam 86 moves to the driving side in the longitudinal direction. As shown in FIG. 5, the cylindrical cam 86 moves until one end portion 86*d* of the cylindrical cam 86 finally comes into contact with the end surface 15*g* of the first side plate 15.

Here, as shown in FIG. 4, the drive transmission member 81 is supported at one end (fixed end 81*c*) on the driving side in the axial direction by being fitted in the bearing 94 so as to be rotatable and movable in the axial direction. Further, the drive transmission member 81 has an abutting surface 81*e*, and the cylindrical cam 86 has an abutting portion 86*f* facing the abutting surface 81*e*. A central portion 81*d* of the drive transmission member 81 in the longitudinal direction is spaced from the first side plate 15 with a gap therebetween. In this gap, an inclining member 97 including an inclination urging spring 98 for inclining the drive transmission member 81 is provided on the first side plate 15. The inclining member 97 will be described hereinafter in detail.

As described above, the cylindrical cam 86 moves toward the side away from the cartridge (driving side) in the longitudinal direction. By doing so, the abutting surface 81*e* of the drive transmission member 81 is pushed by the abutting portion 86*f* of the cylindrical cam 86, so that the drive transmission member 81 moves away from the cartridge. By this, the drive transmission member 81 takes the retracted position. That is, in interrelation with the movement of the opening/closing door 13 to the open position, the drive transmission member 81 retracts from the movement path along which the cartridge B is mounted. By this, a space for mounting the cartridge B is secured in the apparatus main assembly A.

The cylindrical cam 86 is a retracting member (evacuation mechanism) which moves the drive transmission member 81 to the retracting position in interrelation with the movement of the opening/closing door 13 to the open position.

<Mounting of Cartridge>

Figure 6:
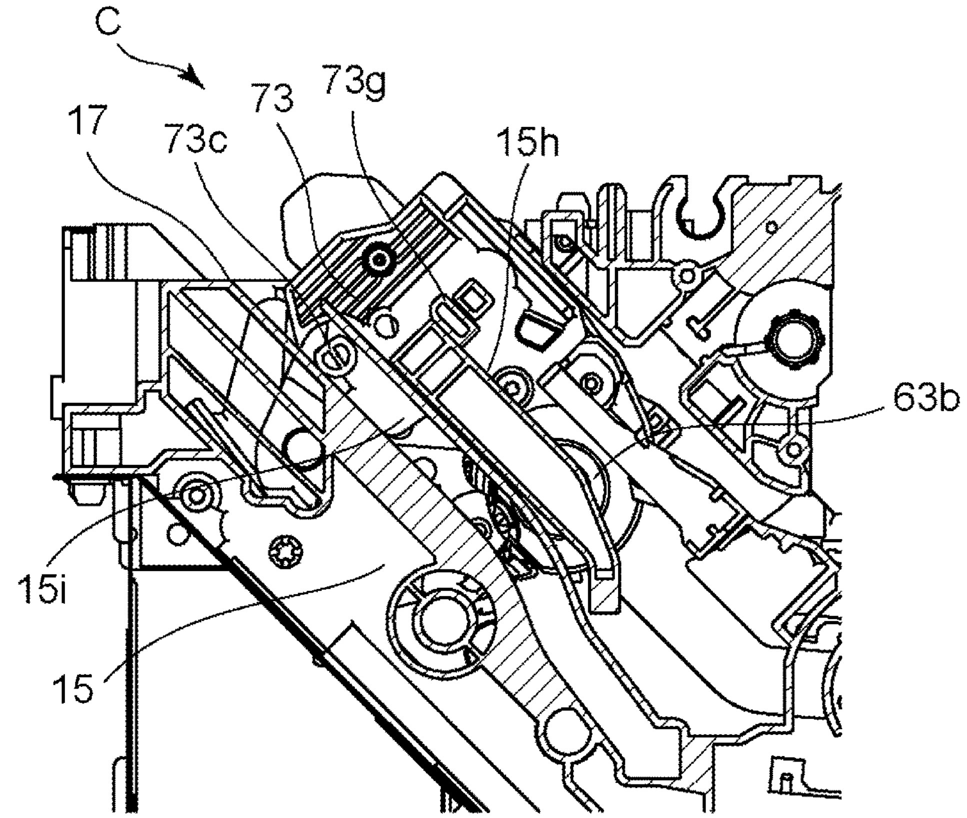
FIG. 6 is a sectional view of the image forming apparatus when the cartridge according to the Embodiment 1 is mounted.
Figure 6:
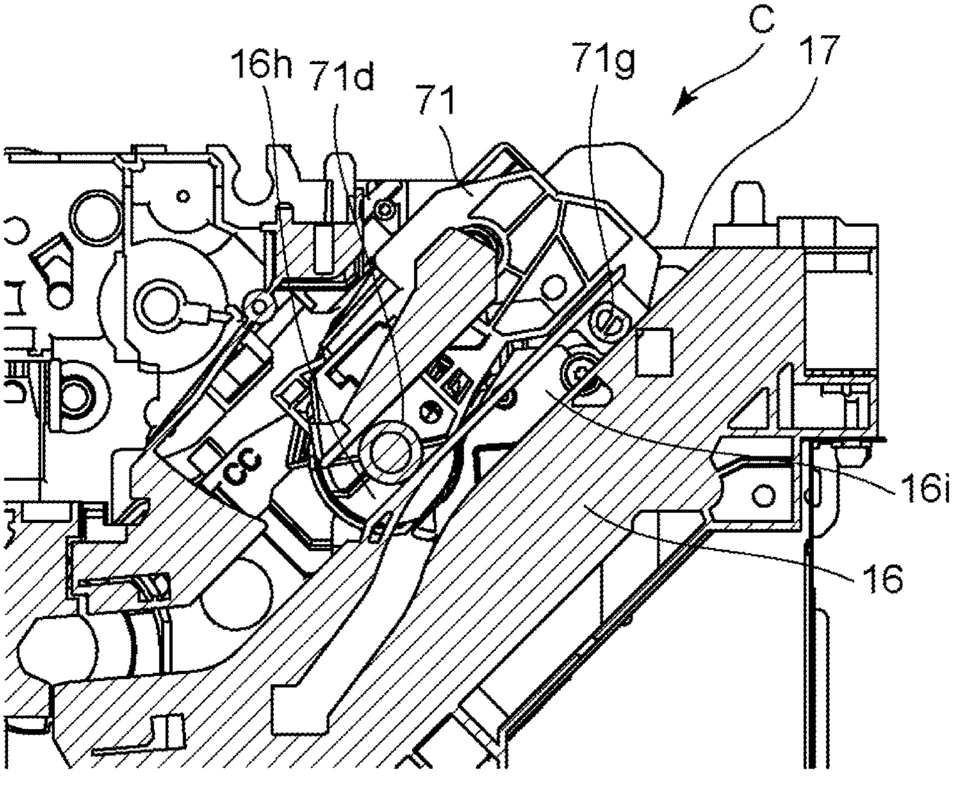

Next, referring to FIG. 6, mounting of the cartridge B will be described. Part (a) of FIG. 6 is a cross-sectional view of the apparatus main assembly as viewed from the driving side when the cartridge is mounted. Part (b) of FIG. 6 is a cross-sectional view of the apparatus main assembly as viewed from the non-driving side when the cartridge is mounted.

As shown in FIG. 6, the first side plate 15 is provided with an upper guide rail 15*h* and a lower guide rail 15*i* as guides, and the side plate 16 is provided with an upper guide rail 16*h* and a lower guide rail 16*i* as guides. In addition, the drum bearing 73 provided on the driving side of the cartridge B is provided with a guided portion 73*g* and a rotation stop portion 73*c*. In the mounting direction of the cartridge B (arrow C), the guided portion 73*g* and the rotation stop portion 73*c* are placed on the upstream side of the axis of the coupling projection 63*b*. Further, the cleaning frame 71 is provided with a positioned portion 71*d* and a rotation stop portion 71*g* on the non-driving side in the longitudinal direction.

The mounting direction C of the cartridge B is a direction substantially perpendicular to the axis of the drum 62. Further, in the case that upstream or downstream in the mounting direction is referred to, the upstream and downstream are defined in the moving direction of the cartridge B immediately before the mounting to the apparatus main assembly A is completed.

When the cartridge B is mounted through the cartridge insertion slot 17 of the apparatus main body A, the driving side of the cartridge B is guided by the guided portion 73*g* of the cartridge B and the rotation stop portion 73*c* being guided on the guide rail 15*h* of the apparatus main assembly A and on the guide rail 15*i* of the apparatus main assembly A. On the non-driving side of the cartridge B, the positioned portion 71*d* and the rotation stop portion 71*g* of the cartridge B are guided by the guide rail 16*h* and the guide rail 16*i* of the apparatus main assembly A. By this, the cartridge B is mounted to the apparatus main assembly A.

Figure 7:
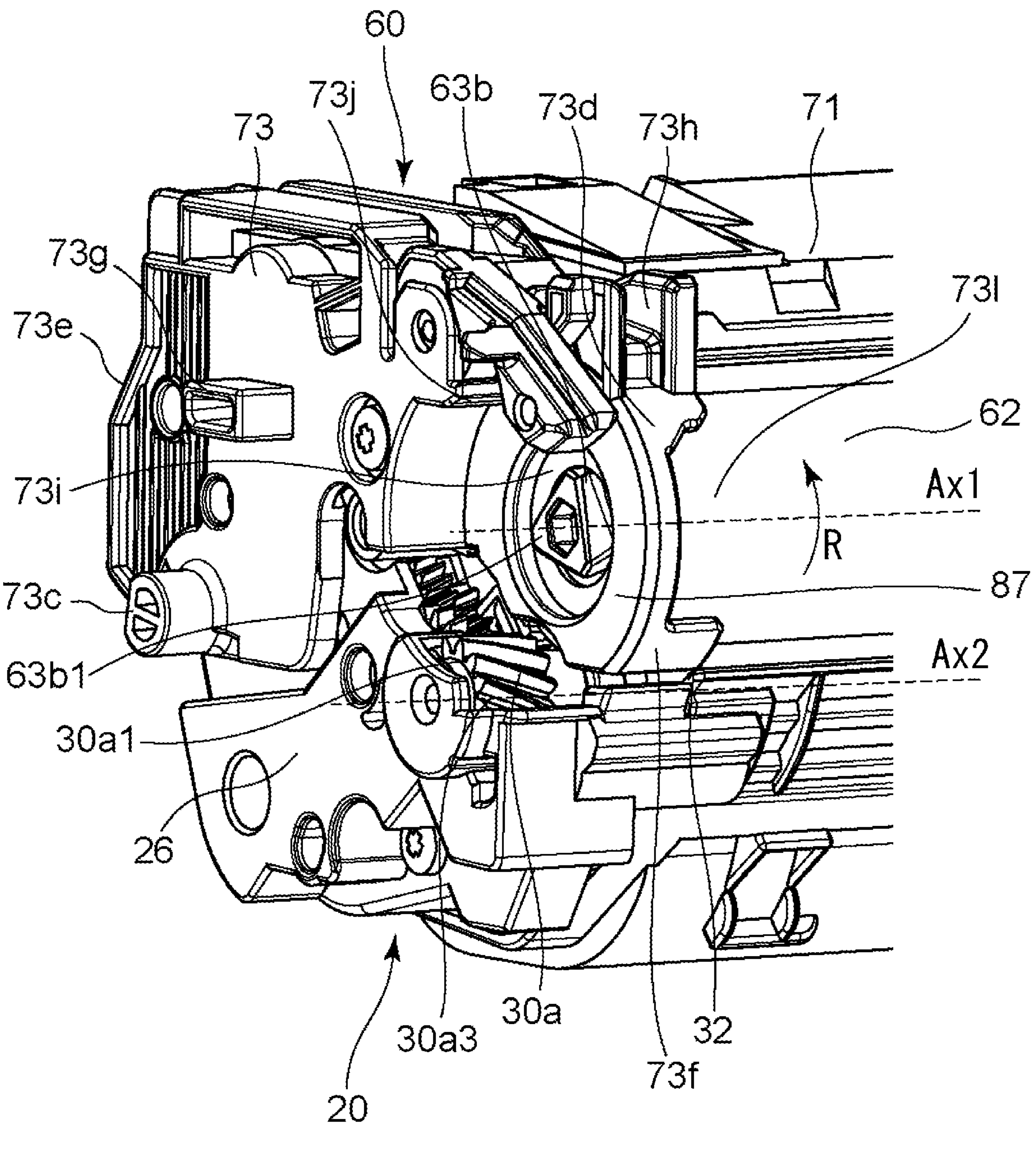
FIG. 7 is a perspective view of the driving side of the cartridge according to embodiment 1.

FIG. 7 is a perspective view of the driving side of the cartridge. As shown in FIG. 7, the developing roller 32 is provided at the end thereof with a developing roller gear (developing gear) 30. That is, the developing roller gear 30 is connected to the shaft portion (shaft) of the developing roller 32.

The developing roller 32 and the developing roller gear 30 are coaxial and rotate about the axis Ax2 shown in FIG. 7. The axis Ax2 of the developing roller 32 is placed so as to be substantially parallel with the axis Ax1 of the axis of the drum 62. Therefore, the axial direction of the developing roller gear 30 is substantially parallel with the axial direction of the drum 62.

The developing roller gear 30 is a drive input gear (cartridge side gear, drive input member) to which a driving force (rotational force) is inputted from the outside of the cartridge B (that is, the apparatus main assembly A). The developing roller 32 is structured to be rotated by the driving force received by the developing roller gear 30.

As shown in FIG. 7, a space 87 is provided on the side surface of the cartridge B on the driving side so as to uncover the developing roller gear 30 and the coupling projection 63*b* on the drum (62) side of the developing roller gear 30.

The coupling projection 63*b* is formed on a drive-side drum flange (coupling member, drum coupling) 63 mounted to an end portion of the drum. The coupling projection 63*b* is a coupling portion (drum side coupling portion, cartridge side coupling portion, photosensitive member side coupling portion, input coupling portion, drive input portion) to which the driving force (rotational force) is inputted from the outside of the cartridge B (that is, the apparatus main assembly A). The coupling projection 63*b* is placed coaxially with the drum 62. That is, the coupling projection 63*b* rotates about the axis Ax1.

Further, in the longitudinal direction of the cartridge B, the side provided with the coupling projection 63*b* is the driving side, and the opposite side corresponds to the non-driving side.

In addition, as shown in FIG. 7, the developing roller gear 30 has a gear portion (input gear portion, cartridge side gear portion, developing side gear portion) 30*a* and an end surface 30*al* on the driving side of the gear portion. The teeth (gear teeth) formed on the outer circumference of the gear portion 30*a* are helical teeth inclined with respect to the axis of the developing roller gear 30. That is, the developing roller gear 30 is a helical gear.

Here, the "helical" includes a shape in which a plurality of projections are arranged along a line inclined with respect to the axis of the gear to substantially form a helical shape.

As shown in FIG. 4, the drive transmission member (drive output member, main assembly side drive member) 81 includes a gear portion (main assembly side gear portion, output gear portion) 81*a* for driving the developing roller gear 30. The gear portion 81*a* has an end surface 81*al* at an end portion on the non-driving side thereof. The teeth (gear teeth) formed on the gear portion 81*a* are also helical teeth inclined with respect to the axis of the drive transmission member 81. That is, the drive transmission member 81 is also provided with a portion which serves as a helical gear.

Further, the drive transmission member 81 has a coupling recess 81*b*. The coupling recess 81*b* is a coupling portion (main assembly side coupling portion, output coupling portion) provided in the apparatus main assembly side. The coupling recess portion 81*b* is formed in the coupling cylindrical portion 81*i* provided at the free end of the drive transmission member 81, as a recess capable of coupling with the coupling projection 63*b* provided on the drum side.

The space 87 provided to uncover the gear portion 30*a* and the coupling projection 63*b* is for accepting the gear portion 81*a* of the drive transmission member 81 when the cartridge B is mounted on the apparatus main assembly A. Therefore, the space 87 is larger than the gear portion 81*a* of the drive transmission member 81. Because of existence of the space 87, the drive transmission member 81 does not interfere with the cartridge B when the cartridge B is mounted to the apparatus main assembly A. The space 87 allows the cartridge B to be mounted to the apparatus main assembly A by accepting the drive transmission member 81 inside the space 87.

In addition, as shown in FIG. 7, as the cartridge B is viewed along the axis of the drum 62 (the axis of the coupling projection 63*b*), the gear teeth of the gear portion 30*a* are placed in the position adjacent to the peripheral surface of the drum 62.

In the axial direction of the developing roller gear 30, the gear teeth of the gear portion 30*a* have an exposed portion 30*a*3 exposed through the cartridge B. If the gear portion 30*a* of the developing roller gear 30 is exposed from the developing side member 26 on the driving side, the gear portion 81*a* meshes with the gear portion 30*a* without interfering with the developing side member 26 on the driving side so as to permit the drive transmission.

Then, at least a portion of the exposed portion of the gear portion 30*a* is placed more outside (driving side) of the cartridge B than the free end portion 63*b*1 of the coupling projection 63*b*, and it faces the axis of the drum. FIG. 7 shows a state in which the gear teeth, of the gear portion 30*a*, in the exposed portion 30*a*3 face the rotation axis (rotation axis of the coupling portion 63*b*) Ax1 of the drum 62. The axis Ax1 of the drum 62 is above the exposed portion 30*a*3 of the gear portion 30*a*.

In FIG. 7, since at least the portion of the gear portion 30*a* projects toward the driving side beyond the coupling projection 63*b* in the axial direction, the gear portion 30*a* overlaps with the gear portion 81*a* of the drive transmission member 81 in the axial direction. Since a portion of the gear portion 30*a* is exposed so as to face the axis Ax1 of the drum 62, the gear portion 30*a* and the gear portion 81*a* of the drive transmission member 81 are capable of contacting with each other in the process of inserting the cartridge B into the apparatus main assembly A.

As a result of employing the above-described arrangement, the gear portion 30*a* of the developing roller gear 30 and the gear portion 81*a* of the drive transmission member 81 can be meshed with each other in the process of mounting the cartridge B to the apparatus main assembly A.

In the mounting direction C of the cartridge B, the center (axis) of the gear portion 30*a* is placed on the upstream side of the center (axis) of the drum 62.

The drum bearing 73 is provided with a fitted 73*h* as a positioned portion (positioned portion in the axial direction) in the longitudinal direction (axial direction). The first side plate 15 of the apparatus main assembly A is provided with a fitting portion 15*j* (see FIG. 17) which can be fitted with the fitted portion 73*h*. The position of the cartridge B in the longitudinal direction (axial direction) is determined by the fitted portion 73*h* of the cartridge B is fitted with the fitting portion 15*j* of the apparatus main assembly A in the above-mentioned mounting process. In this embodiment, the fitted portion 73*h* is a slit (groove).

<Operation to Close the Opening/Closing Door after Mounting the Cartridge>

Next, a state in which the opening/closing door 13 is closed will be described. Part (a) of FIG. 8 is a cross-sectional view illustrating a cartridge pressing portion and a positioning portion on the driving side, and part (b) of FIG. 8 is a cross-sectional view illustrating a cartridge pressing portion and a positioning portion on the non-driving side.

Figure 8:
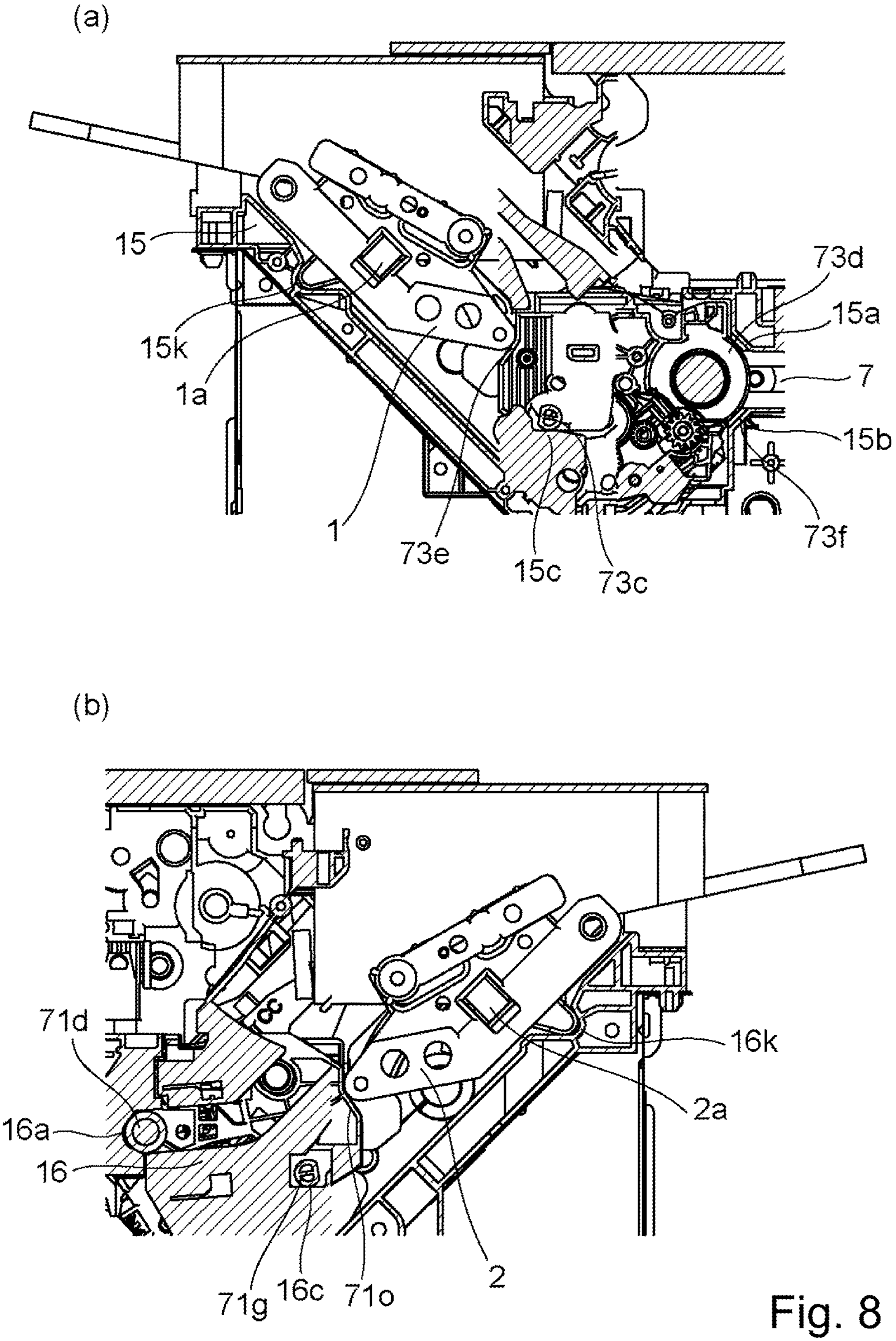
FIG. 8 is a sectional view of an image forming apparatus showing a cartridge pressing portion and a positioning portion according to the Embodiment 1.

As shown in FIG. 8, the first side plate 15 is provided with an upper positioning portion 15*a*, a lower positioning portion 15*b*, and a rotation stop portion 15*c*, for positioning, and the side plate 16 is provided with a positioning portion 16*a* and a rotation stop portion 16*c*. The drum bearing 73 is provided with an upper positioned portion (first positioned portion, first projection, first projecting portion) 73*d* and a lower positioned portion (second positioned portion, second projection, second projecting portion) 73*f*.

Further, the cartridge pressing members 1 and 2 are slidably mounted to the opposite ends of the opening/closing door 13 in the axial direction, respectively. The cartridge pressing springs 1*a* and 2*a* are mounted to the cartridge pressing members 1 and 2, respectively. As the urging force receiving portion on the cartridge side, the drum bearing 73 is provided with a pressed portion 73*e* on the driving side, and the cleaning frame 71 is provided with a pressed portion 71*o* on the non-driving side. As the urging force receiving portion on the apparatus main assembly side, the first side plate 15 is provided with a pressed portion 15*k*, and the side plate 16 is provided with a pressed portion 16*k*.

By closing the opening/closing door 13, the pressed portions 73*e* and 71*o* of the cartridge B and the pressed portions 15*k* and 16*k* of the apparatus main assembly A are pressed by the cartridge pressing members 1 and 2 which are urged by the cartridge pressing springs 1*a* and 2*a* of the apparatus main assembly A.

By this, on the driving side, the upper positioned portion 73*d*, the lower positioned portion 73*f*, and the rotation stop portion 73*c* of the cartridge B come into contact with the upper positioning portion 15*a*, the lower positioning portion 15*b*, and the rotation stop portion 15*c* of the apparatus main assembly A, respectively. As a result, the cartridge B and the drum 62 are positioned on the driving side. In addition, on the non-driving side, the positioned portion 71*d* and the rotation stop portion 71g of the cartridge B come into contact with the positioning portion 16*a* and the rotation stop portion 16*c* of the apparatus main assembly A, respectively. By this, the cartridge B and the drum 62 are positioned on the non-driving side.

The pressed portions 73*e* and 71*o* are placed on one end side (driving side) and the other end side (non-driving side) of the cartridge B in the longitudinal direction, respectively. Particularly, the pressed portion 73*e* is provided on the drum bearing 73. The pressed portions 73*e* and 71*o* have a recess shape (V-shape) so that the positions of the cartridge pressing members 1 and 2 are determined, and the cartridge pressing members 1 and 2 are positioned by the pressed portions 73*e* and 71*o*.

As shown in FIG. 7, the upper positioned portion 73*d* and the lower positioned 73*f* are placed adjacent to the drum 62. In addition, the upper positioned portion 73*d* and the lower positioned portion 73*f* are arranged along the rotational direction of the drum 62. Further, in the drum bearing 73, it is necessary to assure a space (arc-shaped recess) 73l for arranging the transfer roller 7 between the upper positioned portion 73*d* and the lower positioned portion 73*f*. Therefore, the upper positioned portion 73*d* and the lower positioned portion 73*f* are disposed apart from each other. The upper positioned portion 73*d* and the lower positioned portion 73*f* are projections projecting inward in the axial direction from the drum bearing 73. As described above, it is necessary to assure the existence of the space 87 around the coupling projection 63*b*. Therefore, the space 87 is by projecting the upper positioned portion 73*d* and the lower positioned portion 73*f* inward, instead of projecting outward, in the axial direction.

Further, in FIG. 7, the upper positioned portion 73*d* and the lower positioned portion 73*f* are placed so as to partially cover the drive-side drum flange 63 provided at the end of the photosensitive drum 62. As the positioned portion 73*d* and the drive-side drum flange 63 are projected onto the axis of the drum 62, at least a portion of the projected regions of the upper positioned portion 73*d* and the drive-side drum flange 63 overlap each other. In this respect, the lower positioned portion 73*f* is the same as the upper positioned portion 73*d*.

In addition, as shown in FIGS. 4 and 5, by closing the opening/closing door 13, the cylindrical cam 86, becomes movable toward the non-driving side (the side approaching the cartridge B) in the longitudinal direction by way of the cylindrical cam link 85, while the slope portions 86*a*, 86*b*, 86*c* rotates along the slope portions 15*d*, 15*e* and 15*f* of the first side plate 15. By this, the drive transmission member 81 which has been in the retracted position becomes movable toward the non-driving side (the side approaching the cartridge B) in the longitudinal direction.

<Drive Start Operation of Drive Transmission Member>

Next, the drive start operation of the drive transmission member after the opening/closing door is closed will be described.

Figure 9:
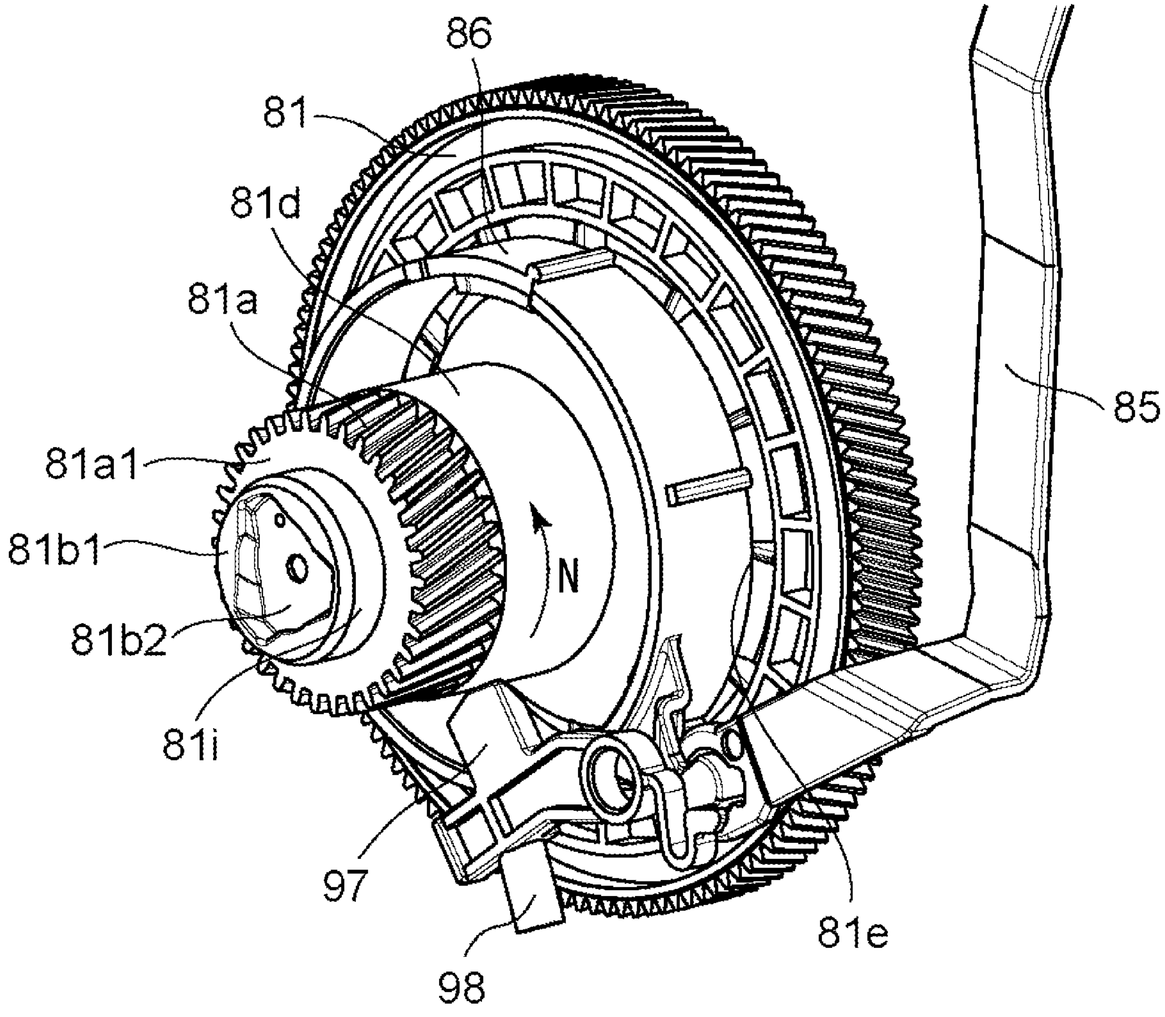
FIG. 9 is a perspective view of the drive transmission member according to embodiment 1.

FIG. 9 is a perspective view of the drive transmission member. As shown in FIG. 9, the drive transmission member 81 is provided with the coupling recess 81*b* having a free end portion 81*b*1 of the coupling recess 81*b* on the non-driving side, and has a positioning bottom portion 81*b*2 at the bottom of the coupling recess 81*b*. The coupling recess 81*b* of the drive transmission member 81 is a hole having a substantially triangular cross-section. As viewed from the non-driving side (cartridge side, opening side of the recess 81*b*), the coupling recess 81*b* has a shape twisted in the counterclockwise direction N toward the driving side (the back side of the recess 81*b*). The gear portion 81*a* of the drive transmission member 81 is a helical gear, and has gear teeth twisted counterclockwise N toward the driving side when viewed from the non-driving side (cartridge side).

The gear portion 81*a* and the coupling recess 81*b* are arranged so that the axis of the gear portion 81*a* and the axis of the coupling recess 81*b* overlap with the axis of the drive transmission member 81. That is, the gear portion 81*a* and the coupling recess 81*b* are arranged coaxially (concentrically) with each other.

As shown in FIG. 7, the drum bearing 73 has a recess bottom surface 73*i*, and the drive-side drum flange 63 is provided with a coupling projection 63*b* on the driving side and a free end portion 63*b*1 at the free end of the coupling projection 63*b*. The coupling projection 63*b* of the drive-side drum flange 63 has a substantially triangular cross-section and a projection shape (projection, protrusion). The coupling projection 63*b* has a shape twisted counterclockwise in a direction from the driving side (the free end side of the coupling projection 63*b*) toward the non-driving side (the bottom side of the coupling projection 63*b*). That is, the coupling projection 63*b* is inclined (twisted) in the rotational direction R of the drum from the outside to the inside of the cartridge in the axial direction.

In the coupling projection 63*b*, the portion (ridge line) forming the corner (the apex of the triangle) of the triangular prism is a driving force receiving portion which actually receives the driving force (rotational force) from the coupling recess portion 81*b*. The driving force receiving portion is inclined toward a downstream side of the rotational movement direction of the drum from the outside to the inside of the cartridge in the axial direction. Further, the inner surface (inner peripheral surface) of the coupling recess 81*b* functions as a driving force applying portion for applying a driving force to the coupling projection 63*b*.

The shapes of the cross-section of the coupling projection 63*b* and the coupling recess portion 81*b* are not strict triangles (polygons), that is, and may be in the form of collapsed corners, for example, and therefore, such are also referred to as substantial triangles (polygons). That is, the coupling projection 63*b* has a shape resulting from twisting a projection having a substantially triangular prism (polygonal prism). However, the shape of the coupling projection 63*b* is not limited to such a shape. The shape of the coupling projection 63*b* may be changed as long as it can be coupled with the coupling recess portion 81*b*, that is, if it can be engaged and driven. For example, three bosses are arranged at the apexes of a triangle, and each boss is twisted about the axis of the drum 62.

As shown in FIG. 7, the gear portion 30*a* of the developing roller gear 30 is a helical gear, and has a shape twisted (inclined) clockwise in the direction from the driving side toward the non-driving side. That is, the gear teeth (helical teeth) of the gear portion 30*a* are inclined (twisted) in the clockwise direction (rotational direction of the developing roller and the developing roller gear) from the outside to the inside of the cartridge in the axial direction of the gear portion 30*a*. That is, the gear 30*a* is inclined (twisted) in the direction opposite to the rotational movement direction R of the drum 62 from the outside to the inside in the axial direction.

Figure 10:
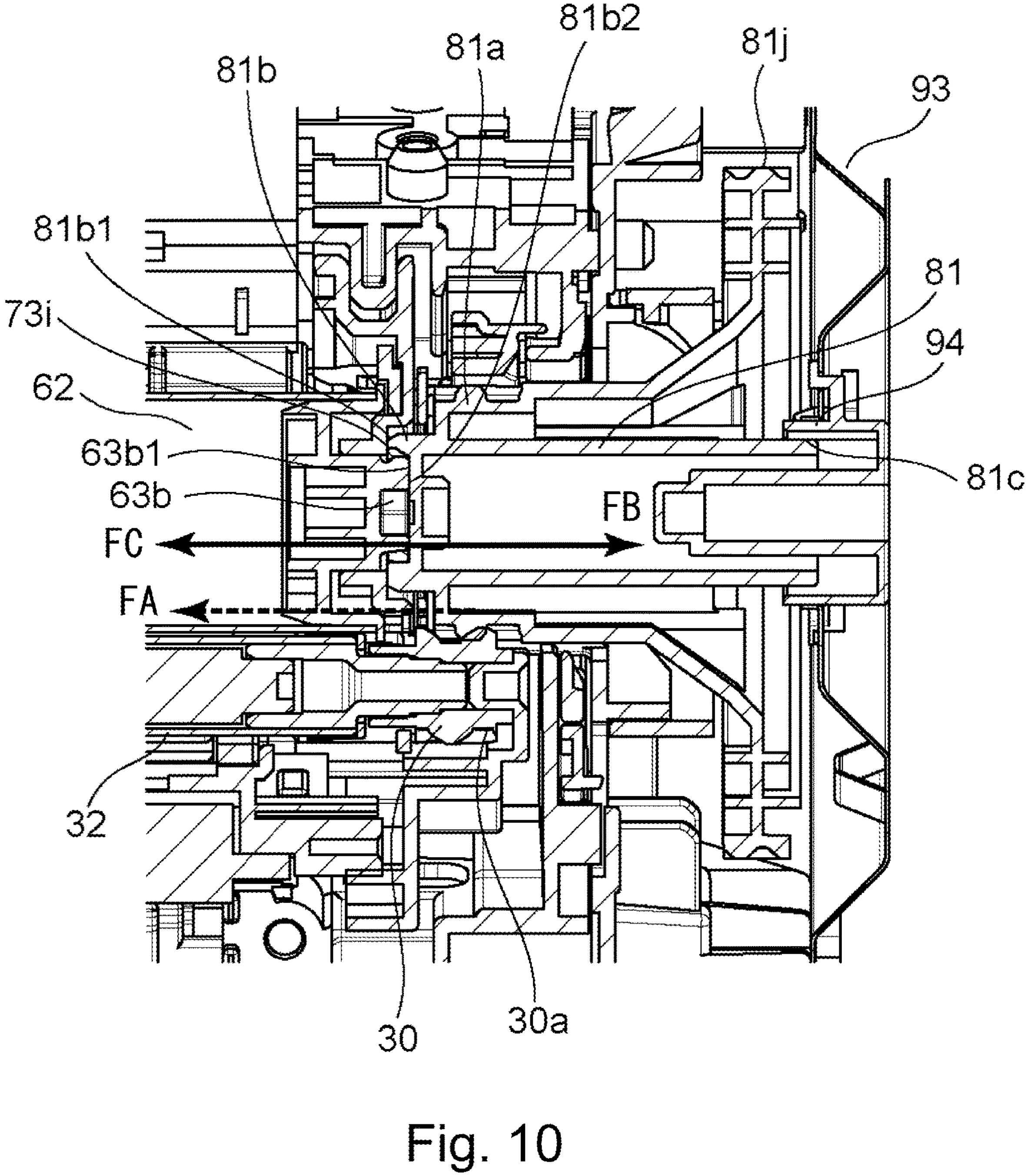
FIG. 10 is a sectional view illustrating an operation of the drive transmission member in a thrust direction at the time of coupling engagement operation according to the Embodiment 1.

FIG. 10 is a longitudinal-sectional view illustrating the operation of the drive transmission member in the thrust direction when the coupling is engaged. As shown in FIG. 10, the drive transmission member 81 is rotated by a motor (not shown) in the clockwise direction (rotational direction of the drum 62) as viewed from the non-driving side (cartridge side). Then, a thrust force (force generated in the axial direction) is produced by the helical teeth meshing engagement between the gear portion 81*a* of the drive transmission member 81 and the gear portion 30*a* of the developing roller gear 30. This results in that a force FA in the axial direction (longitudinal direction) is applied to the drive transmission member 81, and the drive transmission member 81 tends to move toward the non-driving side (the side approaching the cartridge) in the longitudinal direction. That is, the drive transmission member 81 approaches and contacts the coupling projection 63*b*.

Then, when the drive transmission member 81 rotates and the triangular phases of the coupling recess portion 81*b* and the coupling projection 63*b* are matched, the coupling projection 63*b* and the coupling recess portion 81*b* come into engagement (coupling) with each other.

When the projection 63*b* and the coupling recess portion 81*b* are engaged with each other, a new thrust force FC is produced because both the coupling recess portion 81*b* and the coupling projection 63*b* are twisted (tilted) about the axis line.

That is, a force FC acts on the drive transmission member 81 toward the non-driving side (the side approaching to the cartridge) in the longitudinal direction. The force FC and the force FA described above are combined to further move the drive transmission member 81 toward the non-driving side (the side closer to the cartridge) in the longitudinal direction. That is, the coupling projection 63 acts to bring the drive transmission member 81 closer to the coupling projection 63*b* side of the cartridge B.

The drive transmission member 81 attracted by the coupling projection 63*b* is positioned in the longitudinal direction (axial direction) by the free end portion 81*b*1 of the drive transmission member 81 coming into contact with the recess bottom surface 73*i* of the drum bearing 73.

Further, a reaction force FB of a force FC acts on the drum 62, and the reaction force (drag) FB causes the drum 62 to move toward the driving side (the side closer to the drive transmission member 81, the outside of the cartridge B) in the longitudinal direction. That is, the drum 62 and the coupling projection 63*b* are attracted toward the drive transmission member 81 side. By this, in the drum 62, the free end portion 63*b*1 of the coupling projection 63*b* comes into contact with the bottom portion 81*b*2 of the coupling recess 81*b*. By this, the drum 62 is also positioned in the axial direction (longitudinal direction).

That is, the coupling projection 63*b* and the coupling recess portion 81*b* are attracted to each other, so that the positions of the drum 62 and the drive transmission member 81 in the axial direction are determined.

In this state, the drive transmission member 81 is in the driving position (advanced position). In other words, the drive transmission member 81 is in a position for transmitting a drive force to the coupling projection 63*b* and the gear portion 30*a*, respectively, and is in a position advanced toward the cartridge.

Further, the center of the free end of the drive transmission member 81 is determined with respect to the driving side drum flange 63 by a triangular centering action of the coupling recess 81*b*. That is, the drive transmission member 81 is centered with respect to the drum flange 63, and therefore, the drive transmission member 81 and the photosensitive member become coaxial with each other. By this, the drive is accurately transmitted from the drive transmission member 81 to the developing roller gear 30 and to the driving side drum flange 63.

The coupling recess portion 81*b* and the coupling projection 63*b* engaged with the coupling recess portion 81*b* can also be regarded as centering portions. That is, by engaging the coupling recess portion 81*b* and the coupling projection 63*b* with each other, the drive transmission member 81 and the drum are made coaxial with each other. In particular, the coupling recess portion 81*b* is referred to as a main assembly side centering portion (image forming apparatus main assembly side centering portion), and the coupling projection 63*b* is referred to as a cartridge side centering portion.

As described above, the engagement of the coupling is assisted by the force FA and the force FC acting on the drive transmission member 81 toward the non-driving side.

Further, by positioning the drive transmission member 81 by the drum bearing (bearing member) 73 provided on the cartridge B, the position precision of the drive transmission member 81 relative to the cartridge B can be improved.

The positional accuracy of the gear portion 30*a* of the developing roller gear 30 and the gear portion 81*a* of the drive transmission member 81 in the longitudinal direction is improved, and therefore, the width of the gear portion 30*a* of the developing roller gear 30 can be made small. The cartridge B and the apparatus main assembly A for mounting the cartridge B can be downsized.

Summarizing this embodiment as described above, the gear portion 81*a* of the drive transmission member 81 and the gear portion 30*a* of the developing roller gear 30 are helical gears. Helical gears have a higher meshing rate between teeth than that of spur gears. As a result, the rotation accuracy of the developing roller 32 is improved, so that the developing roller 32 rotates smoothly.

Further, the direction in which twisting directions of the helical teeth of the gear portion 30*a* and the gear portion 81*a* are selected so that forces (force FA and force FB) which attract the gear portion 30*a* and the gear portion 81*a*, respectively is produced. That is, by rotating the gear portion 30*a* and the gear portion 81*a* in a meshed state, such forces that the coupling recess portion 81*b* provided in the drive transmission member 81 and the coupling projection 63*b* provided at the end of the photosensitive drum 62 are closer to each other are produced. As a result, the drive transmission member 81 moves toward the cartridge B side, and the coupling recess portion 81*b* also approaches to the coupling projection 63*b*. By this, the coupling (coupling) between the coupling recess portion 81*b* and the coupling projection 63*b* is assisted.

<Coupling Engagement Conditions>

Figure 11:
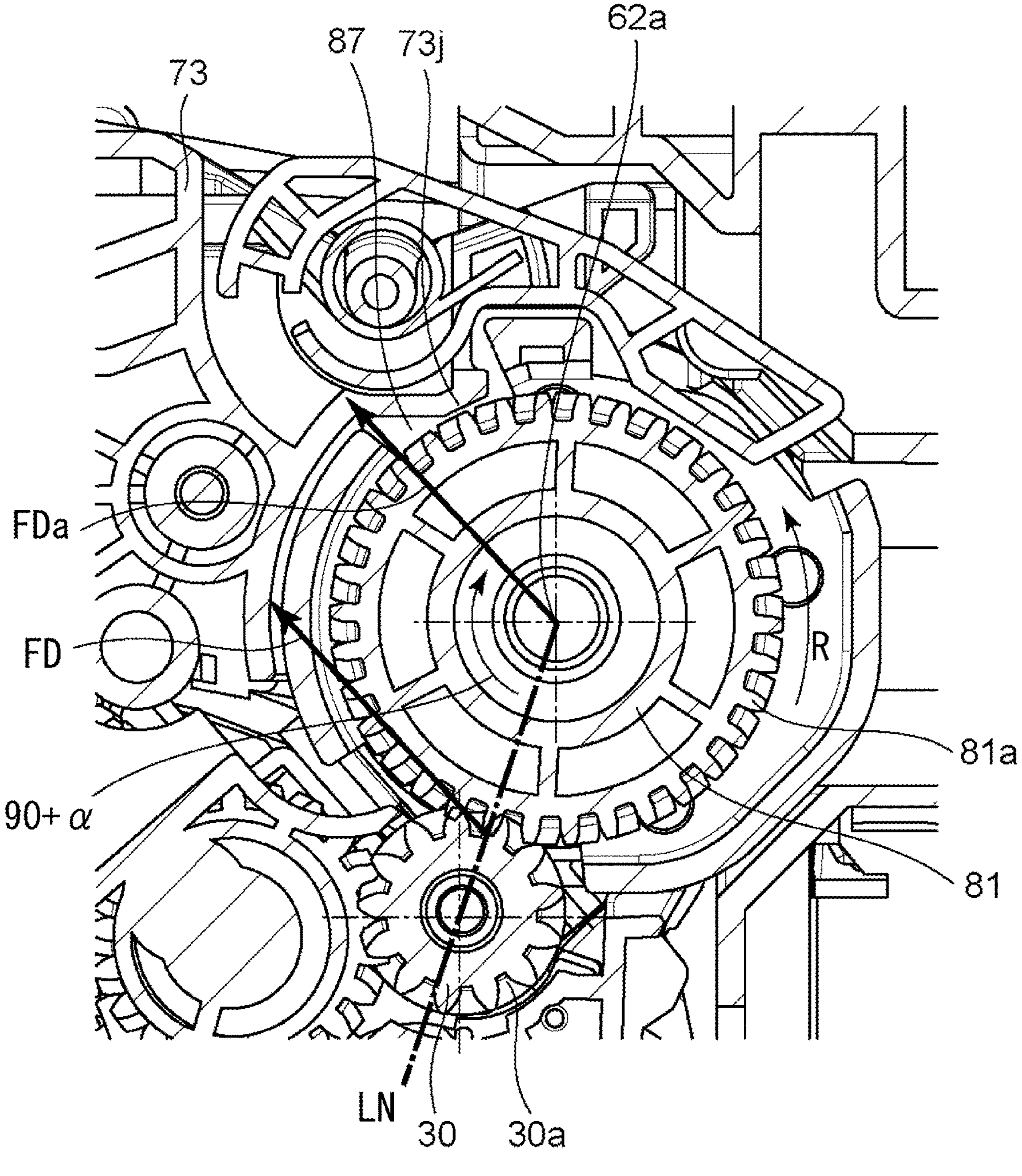
FIG. 11 is a cross-sectional view illustrating the periphery of the drive transmission member at the time of coupling engagement operation according to the Embodiment 1.

Next, referring to FIG. 11, the conditions under which the coupling engagement is established will be specifically described. FIG. 11 is a cross-sectional view of the periphery of the drive transmission member when the coupling is engaged, as viewed from the driving side.

As shown in FIGS. 7 and 11, the drum bearing 73 is provided with the restricting portion 73*j* as an inclination restricting portion (movement restricting portion, position restricting portion, stopper) to restrict the movement of the drive transmission member 81 and restrict (suppress) the inclination of the drive transmission member 81.

As described above, when the drive transmission member 81 starts rotating in the rotation direction R of the drum 62, the gear portion 81*a* of the drive transmission member 81 and the gear portion 30*a* of the developing roller gear 30 are engaged with each other. On the other hand, the coupling recess portion 81*b* and the coupling projection 63*b* are not coupled, or the coupling is insufficient. In this state, when the gear portion 81*a* transmits the driving force to the gear portion 30*a*, the meshing force FD is generated in the gear portion 81*a* due to the meshing of the gears.

When this meshing force FD is applied to the drive transmission member 81, the drive transmission member 81 is tilted. That is, as described above, the drive transmission member 81 is supported only at the fixed end 81*c* (the end far from the cartridge B), which is the end on the driving side, with the result that the drive transmission member 81 is tilted about the end 81*c* (fixed end) on the driving side as a fulcrum. Then, the end portion (free end, free end) of the drive transmission member 81 on the side where the coupling recess 81*b* is provided moves.

If the drive transmission member 81 is tilted to a large extent, the coupling recess portion 81*b* cannot be coupled with the coupling projection 63*b*. In order to avoid this, the cartridge B is provided with the restricting portion 73*j* to suppress (regulate) the inclination of the drive transmission member 81 within a certain range. That is, when the drive transmission member 81 is tilted, the restricting portion 73*j* supports the drive transmission member 81 to constraining the inclination from increasing.

The regulation portion 73*j* of the drum bearing 73 has an arc-shaped curved surface portion placed so as to face the axis of the drum 62 (the axis of the coupling projection 63*b*). The restricting portion 73*j* can also be regarded as a projecting portion projecting so as to cover the drum axis. The portion between the regulation unit 73*j* and the drum axis, is a space 87 in which no component of the process cartridge B is inserted, and the drive transmission member 81 is placed in this space 87. The regulation portion 73*j* faces the space 87, and the regulation portion 73*j* forms a periphery (outer periphery) of the space 87.

The restricting portion 73*j* is placed at such a position that the drive transmission member can be constrained from moving (tilting) against the meshing force FD.

As shown in FIG. 11, the direction in which the meshing force FD is generated is determined by a transverse pressure angle α of the gear portion 81*a* (that is, the transverse pressure angle α of the developing roller gear 30). The direction of the meshing force FD is tilted by 90+α degrees toward upstream of the rotational direction R of the drum 62 with respect to the arrow (half straight line) LN extending from the center 62*a* of the drum (that is, the center of the drive transmission member 81) toward the center 30*b* of the developing roller gear 30. The regulation portion 73*j* does not necessarily have to be placed on the line FDa, but it is preferable that the regulation portion 73*j* is placed near the half-line FDa.

In addition, it is desirable that the regulation portion 73*j* is arranged on the upstream side in the cartridge mounting direction C with respect to the center (axis line) of the coupling projection 63*b*. This is in order for the regulation portion 73*j* not to interfere with the cartridge B in the mounting thereof.

<Inclining Structure for Drive Transmission Member>

Next, the inclining structure of the drive transmission member will be described.

As described above, the drive transmission member 81 has a gear portion 81*a* and a coupling recess 81*b* on the free end side thereof. The drive transmission member 81 is movable back and forth and can be tilted (tilted). When the drive transmission member 81 advances toward the cartridge side while rotating and engages the coupling recess portion 81*b* with the coupling projection 63*b*, it is desirable to reduce the inclination angle of the drive transmission member 81 with respect to the drum 62. Therefore, as described above, the cartridge is provided with the restricting portion 73*j* to suppress the inclination angle of the drive transmission member 81 at the time when the drive transmission member 81 is driven.

On the other hand, in order to remove the cartridge from the main assembly of the apparatus, it is necessary for the gear portion 81*a* of the drive transmission member 81 to break the meshing with the gear portion 30*a* of the developing roller gear 30. In order to smoothly break the meshing, it is desirable that the drive transmission member 81 can be tilted so that the gear portion 81*a* can be separated from the gear portion 30*a*. Therefore, if the drive transmission member 81 per se is supported so as to be smoothly tiltable, the cartridge can be removed smoothly.

In order to tilt the drive transmission member 81 and separate the gear portion 81*a* from the gear portion 30*a*, it is desirable to tilt the drive transmission member 81 so as not to come into contact with the regulation portion 73*j* when the cartridge is dismounted.

Further, while making the drive transmission member 81 easy to tilt in order to break the meshing engagement between the gears, it is necessary that the gear portion 81*a* of the drive transmission member 81 assuredly brought into meshing engagement with the gear portion 30*a* of the developing roller gear 30 when the cartridge is mounted. That is, when the cartridge is mounted, it is required to hold the drive transmission member at a predetermined inclination angle so that the gears are assuredly brought into meshing engagement with each other.

In consideration of these points, while supporting the drive transmission member 81 in the manner that the drive transmission member 81 can be more easily tilted, the drive transmission member 81 is tilted to a suitable attitude and angle when mounting or dismounting the cartridge.

Figure 12:
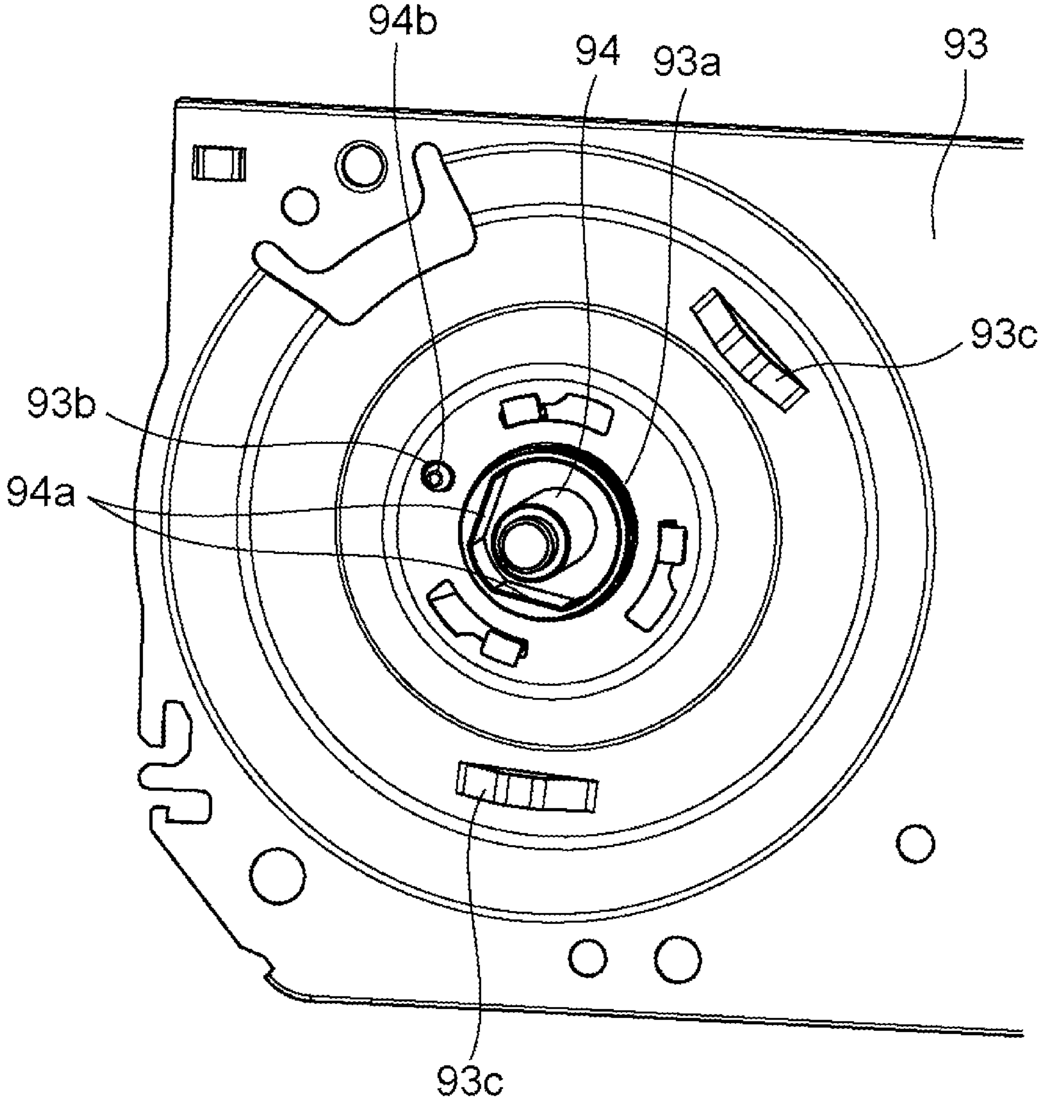
FIG. 12 is a perspective view illustrating a support structure for a bearing of the drive transmission member on the driving side according to the Embodiment 1.

First, the fixed end 81*c* side (rear end side, driving side) of the support structure of the drive transmission member 81 will be described. FIG. 12 is a perspective view illustrating a bearing support structure of the drive transmission member on the driving side.

A second side plate (second driving side plate) 93 is provided on the driving side of the apparatus main assembly A. As shown in FIG. 12, the second side plate 93 is a sheet metal (plate-shaped metal), and a hole portion 93*a* is provided therein by drawing the sheet metal. A bearing 94 is fitted in the hole portion 93*a* of the second side plate 93. The drive transmission member 81 is rotatably supported by the bearing 94. That is, the fixed end 81*c* of the drive transmission member 81 is supported by the bearing 94.

There is play (gap) between the bearing 94 and the fixed end 81*c* of the drive transmission member 81. In this embodiment, it is about 0.9 mm. This play allows the drive transmission member to tilt.

As shown in FIG. 12, a V shaped portion 94*a* is provided at the inner circumference of the bearing 94. The V shaped portion 94*a* comprises two projecting portions (projections) projecting from the inner peripheral portion of the first bearing 94. Since the V-shape is formed by the two projecting portions, these are collectively referred to as the V shaped portion 94*a*.

As described above, there is a gap between the bearing 94 and the fixed end 81*c* of the drive transmission member 81 so that the drive transmission member 81 can be tilted. However, when the drive transmission member 81 transmits the drive to the cartridge, it is necessary to align the axis of the drive transmission member 81 with the axis of the photosensitive drum 62. That is, when the drive transmission member 81 is driven, it is necessary that it is supported with high accuracy without tilting relative to the bearing 94. Therefore, when the drive transmission member 81 is driven, the drive transmission member 81 is kept in a substantially horizontal state by bringing the rear end side of the drive transmission member 81 into contact with the V shaped portion 94*a* comprising two projecting portions (projections). The V shaped portion 94*a* is an attitude determining portion (attitude holding portion) for maintaining the attitude of the drive transmission member 81.

In order to determine the phase of the bearing 94 (that is, to prevent the bearing 94 from rotating in the main assembly of the apparatus), the bearing 94 is provided with a projection 94*b* as a rotation stopper. On the other hand, the second side plate 93 is provided with a hole portion 93*b*. The phase of the bearing 94 is fixed by fitting the projection 94*b* with the hole portion 93*b*. That is, the bearing 94 is fixed to the second side plate 93 so as not to rotate. In addition, the phase of the V shaped portion 94*a* provided on the bearing 94 is also fixed.

The second side plate 93 is provided with a drive idler gear (not shown) that transmits the drive from the motor, and the idler gear transmits the drive to the second gear portion 81*j* of the drive transmission member 81. Further, as shown in FIG. 10, the V shaped portion 94*a* is provided in the neighborhood of the second gear portion 81*j* of the drive transmission member 81 in the axial direction. The drive transmission member 81 tilts with the fixed end 81*c* of the drive transmission member 81 as a fulcrum. Therefore, the tilt fulcrum of the drive transmission member 81 and the position of the second gear portion 81*j* of the drive transmission member 81 are close to each other in the axial direction. Therefore, when the drive transmission member 81 is tilted, change in the distance between the axes of the drive idler gear 96 and the second gear portion 81*j* of the drive transmission member 81 and the misalignment of the flank lines can be reduced. As a result, the meshing engagement between the gears at the start of driving can be stabilized.

The phase of the V shaped portion 94*a* is set at such a position that the drive transmission member 81 can be stably held by meshing with the drive idler gear and the second gear portion 81*j* of the drive transmission member 81. That is, by disposing the V shaped portion 94*a* on the downstream side in the meshing force direction, the fixed end 81*c* of the drive transmission member 81 is abutted against the V shaped portion 94*a* of the bearing 94. By this, the drive transmission member 81 is set to be stably held. The radial position of the V shaped portion 94*a* is between the axes of the drive idler gear 96 and the second gear portion 81*j* of the drive transmission member 81 at this time when the rear end side of the drive transmission member 81 abuts against the V shaped portion 94*a*. This is the position where the distance is appropriate. That is, the drive transmission member 81 is held at a position where the idler gear 96 and the drive transmission member can meshing-engage with each other.

By this, when the drive is not applied, the drive transmission member 81 is tiltable in the range of the play with the rear end side of the drive transmission member 81 as a fulcrum. Further, when the drive is applied, the rear end side of the drive transmission member 81 is urged by the V shaped portion 94*a* with the meshing force so that the first attitude where the distance between the axes of the second gear portion 81*j* of the drive transmission member 81 and the drive idler gear 96 is determined accurately. As a result, the rotational power can be transmitted with high accuracy.

Figure 13:
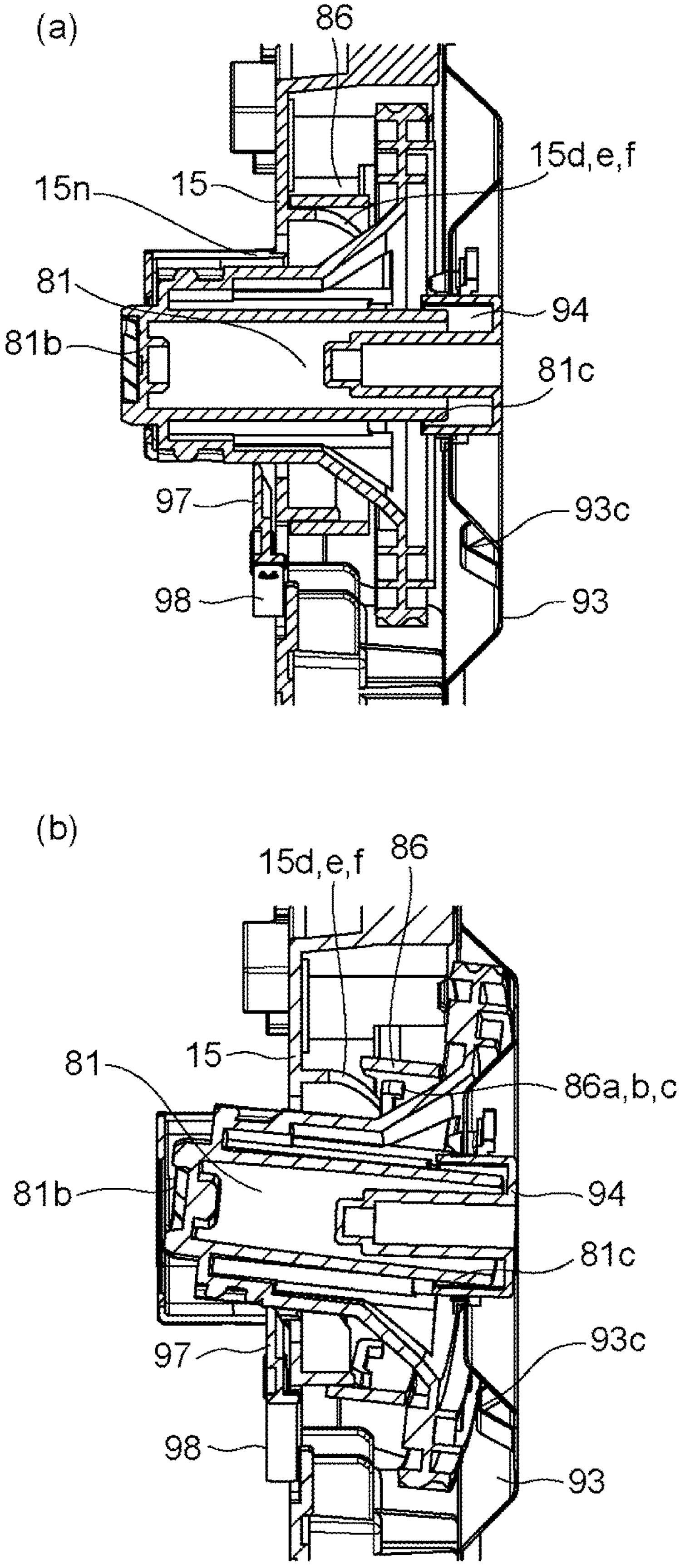
FIG. 13 is a sectional view illustrating an attitude of the drive transmission member according to the Embodiment 1.
Figure 14:
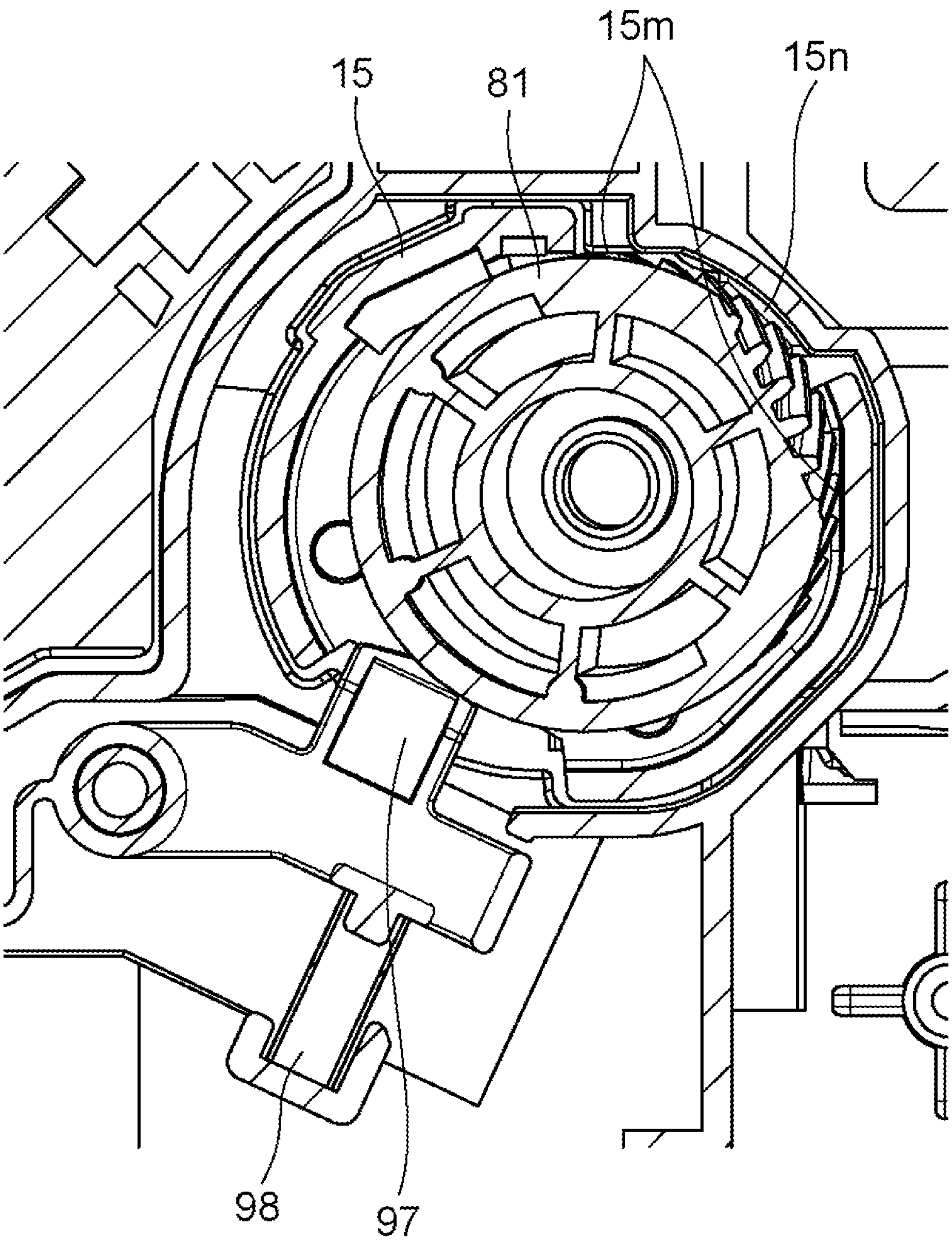
FIG. 14 is a cross-sectional view illustrating an attitude of the drive transmission member when the opening/closing door is opened, according to the Embodiment 1.

Next, the description will be made as to the coupling recess 81*b* side (tip side, free end side, non-driving side) of the supporting structure of the drive transmission member 81. Part (a) of FIG. 13 is a sectional view illustrating the attitude of the drive transmission member when the coupling engagement is established, and part (b) of FIG. 13 is a sectional view illustrating the attitude of the drive transmission member when the opening/closing door is opened. FIG. 14 is a cross-sectional view illustrating the attitude of the drive transmission member when the opening/closing door is opened.

As shown in part (a) of FIG. 13, the drive transmission member 81 at the time of the coupling engagement established is supported with the play due to the space 15*n* provided in the first side plate (first driving side plate) 15. The space 15*n* of the first side plate 15 is placed at a position facing the gear portion 30*a* of the developing roller gear 30. Further, the first side plate 15 is provided with an inclining member 97 provided with an inclining urging spring 98 in order to incline the drive transmission member 81. The urging direction of the inclining member 97 is selected such that, the gear portion 81*a* of the drive transmission member 81 is away from the developing roller gear 30.

Next, as shown in part (b) of FIG. 13, the drive transmission member 81 when the opening/closing door is opened can take a second attitude in which the axis of the drive transmission member 81 is tilted by the inclining member 97. In the drive transmission member 81 in the second attitude, the drive transmission member is inclined so as to fill the space 15*n* of the first side plate 15 with the inclining member 97. Therefore, the gear portion 81*a* of the drive transmission member 81 is inclined so as to be separated from the gear portion 30*a* of the developing roller gear 30. Therefore, a gap is formed in the radial direction between the gear portion 81*a* of the drive transmission member 81 and the gear portion 30*a* of the developing roller gear 30.

The drive transmission member 81 at the time of coupling engagement is urged by the inclining member 97, but the position of the coupling recess 81*b* of the coupling of the drive transmission member 81 is determined by the centering action between the coupling recess portion 81*b* and the coupling projection 63*b* as described above.

As shown in FIG. 14, in the space 15*n* of the first side plate 15, a V-shaped portion 15*m* as a bearing (holding portion) for the drive transmission member 81 at the time when the cartridge B is not mounted. The V-shaped portion 15*m* is placed at such a position in the space 15*n* of the first side plate 15 that it accepts the inclination in order to support the drive transmission member 81 tilted by the inclining member 97. That is, the drive transmission member 81 held in the V-shaped portion 15*m* of the space 15*n* provides a gap in the radial direction between the gear portion 81*a* of the drive transmission member 81 and the gear portion 30*a* of the developing roller gear 30, so that it is possible to disengage the gears when the cartridge B is mounted or dismounted.

<Structure of Cartridge Control Member>

Figure 15:
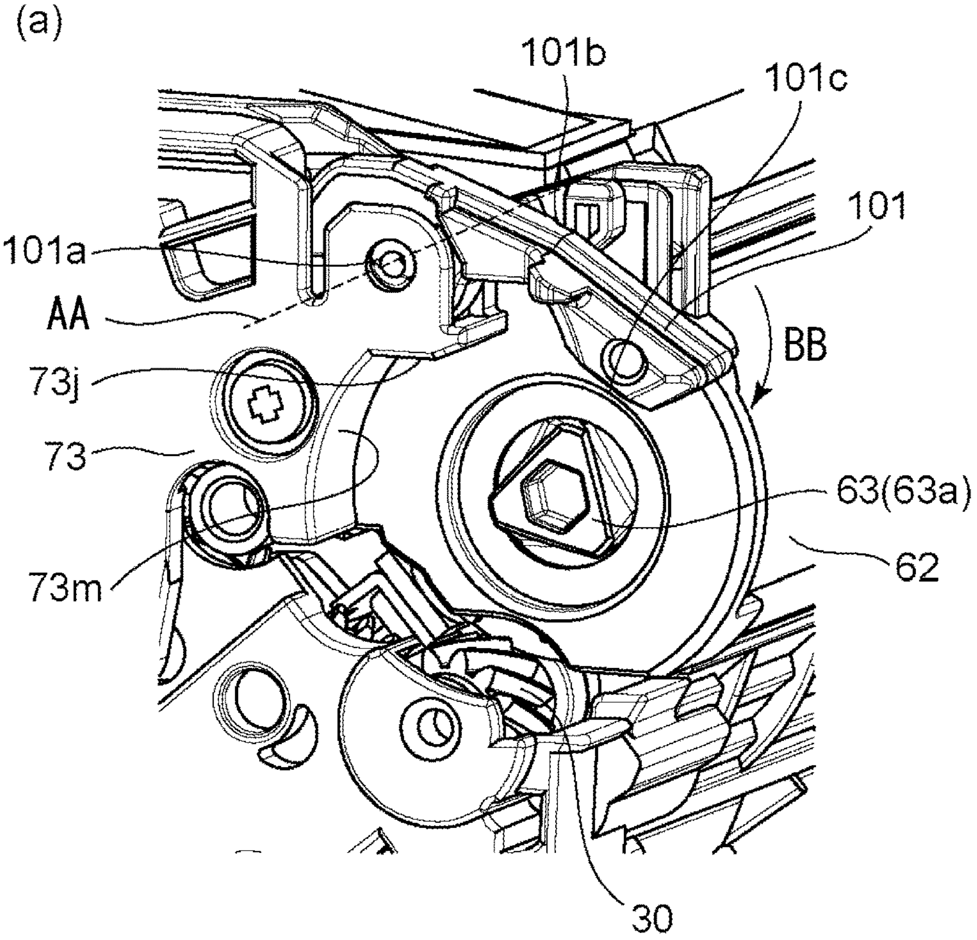
FIG. 15 is a perspective view illustrating a control member for the cartridge according to embodiment 1.
Figure 15:
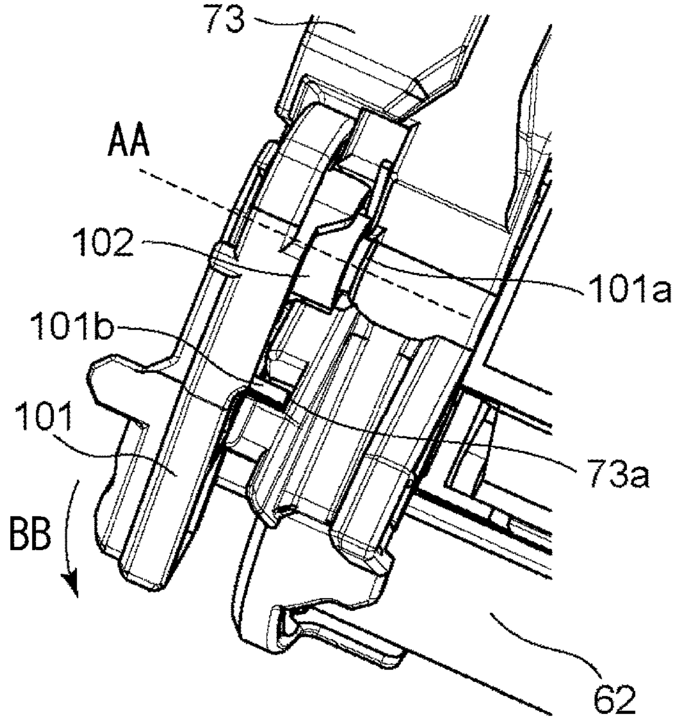

Next, the structure will be described in which a control member (centering auxiliary member, movable member, urging member, centering member, lever member) 101 is provided on the cartridge, in the case that the drive transmission member 81 is structured to be tiltable (inclinable). FIG. 15 is a perspective view illustrating a control member of the cartridge.

As shown in part (a) of FIG. 15, a control member 101, which is a member which controls the attitude of the drive transmission member 81, is provided on the driving side of the cartridge. The control member 101 is a movable member which is movable relative to the photosensitive drum 62. The control member 101 is mounted so as to be rotatable relative to the drum bearing 73 about the axis AA of a support boss 101*a*.

The drum bearing 73 is a part of the frame of the cartridge and rotatably supports the photosensitive drum 62. The drum bearing 73 is a part which forms a side surface of the cartridge on the driving side, and is mounted to an end portion of the cleaning frame 71 on the driving side. Therefore, the drum bearing 73 can be regarded as a part of the cleaning frame 71.

Further, as shown in part (b) of FIG. 15, an urging spring 102, which is a torsion coil spring, is mounted on the support boss 101*a*. The control member 101 is urged in the direction of arrow BB by the urging force of the urging spring 102. On the other hand, the drum bearing 73 is provided with a control member contact portion (stop portion) 73*a* which confines a rotation range of the control member 101. Since the control member 101 is urged in the direction of the arrow BB by the urging spring 102, the control member 101 is in such an attitude that the contacted portion 101*b* of the control member 101 is in contact with the control member abutting portion 73*a*. That is, by the control member abutting portion 73*a* abutting against the control member 101, the movement of the control member 101 is stopped.

Further, as viewed along the axial direction of the drum 62, the control portion (regulating portion, urging portion, acting portion) 101*c* of the control member 101 is placed in the neighborhood of the surface (outer peripheral surface) 62*b* of the drum 62. The position of the control member 101 in this state is called acting position (normal position) of the control member.

Figure 22:
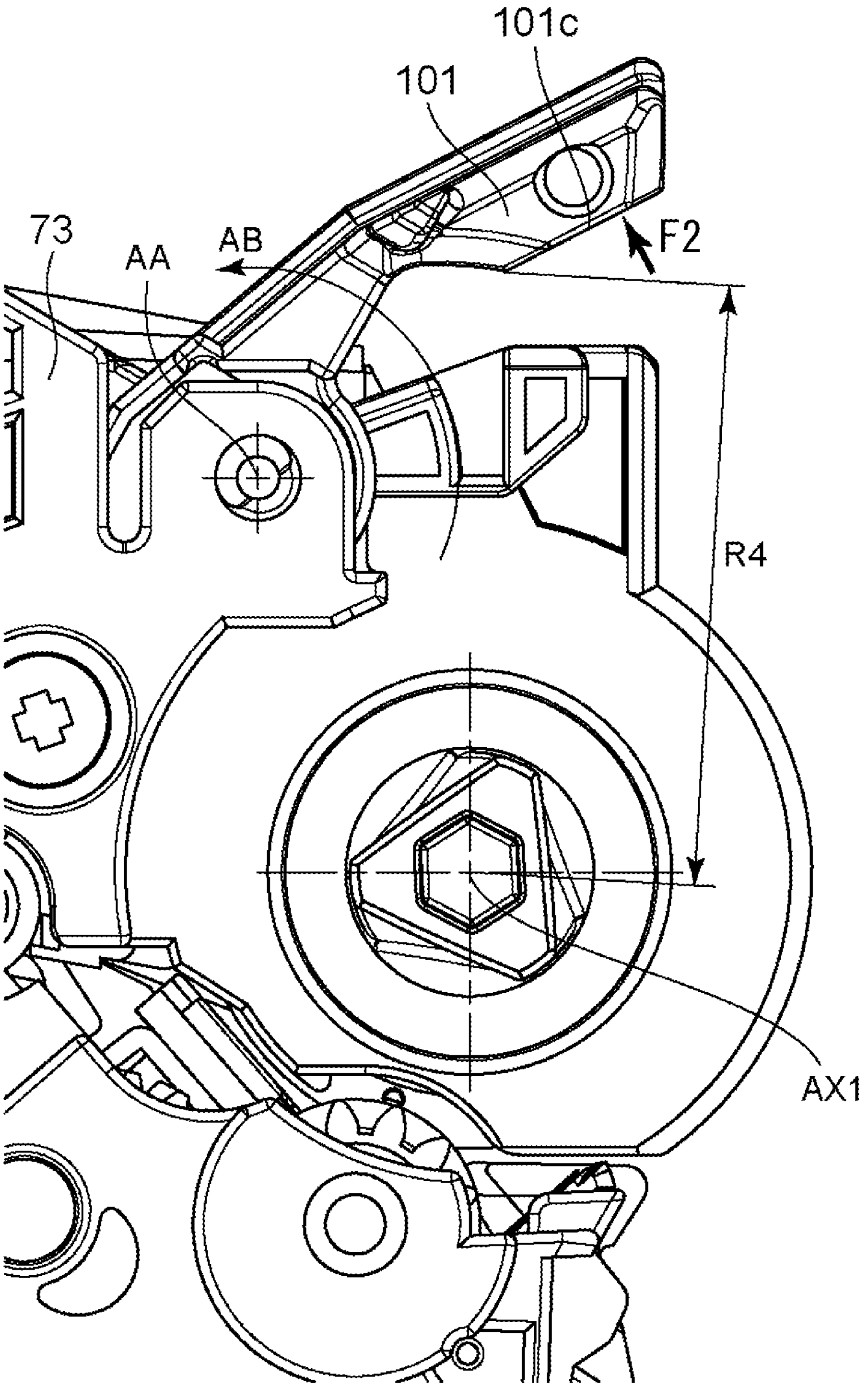
FIG. 22 is a top view of the cartridge according to the Embodiment 1.

On the other hand, the control member 101 is movable also to a retracted position (non-acting position) retracted from the acting position away from the drum 62 when receiving an external force. FIG. 22 is a side view of the cartridge B, which is an example of this structure. The control member 101 is structured to move through a certain distance from the acting position to the retracted position as the cartridge B is being mounted on the apparatus main assembly A. This will be described hereinafter.

The control portion 101*c* of the control member 101 is placed at a position outside in the longitudinal direction with respect to the coupling projection 63*b*.

Figure 19:
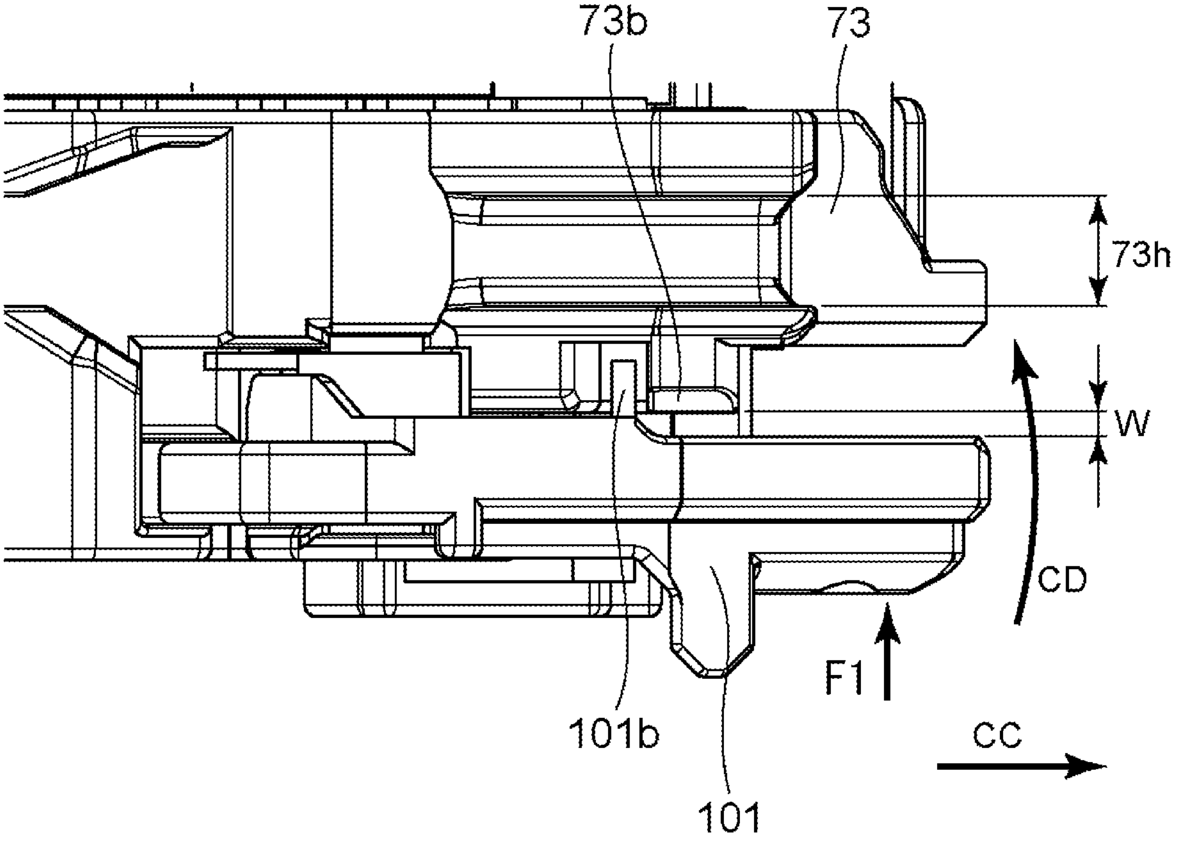
FIG. 19 is a top plan view of the cartridge according to the Embodiment 1.

FIG. 19 is a top view of part (a) of FIG. 15. In FIG. 19, the free end side of the contacted portion 101*b* of the control member 101 in the direction of arrow CC is spaced from the proximity portion 73*b* of the drum bearing 73 by a clearance W. Therefore, when a force F1 is applied to the free end side portion of the control member 101, the control member 101 can bend in the direction of an arrow CD.

Figure 16:
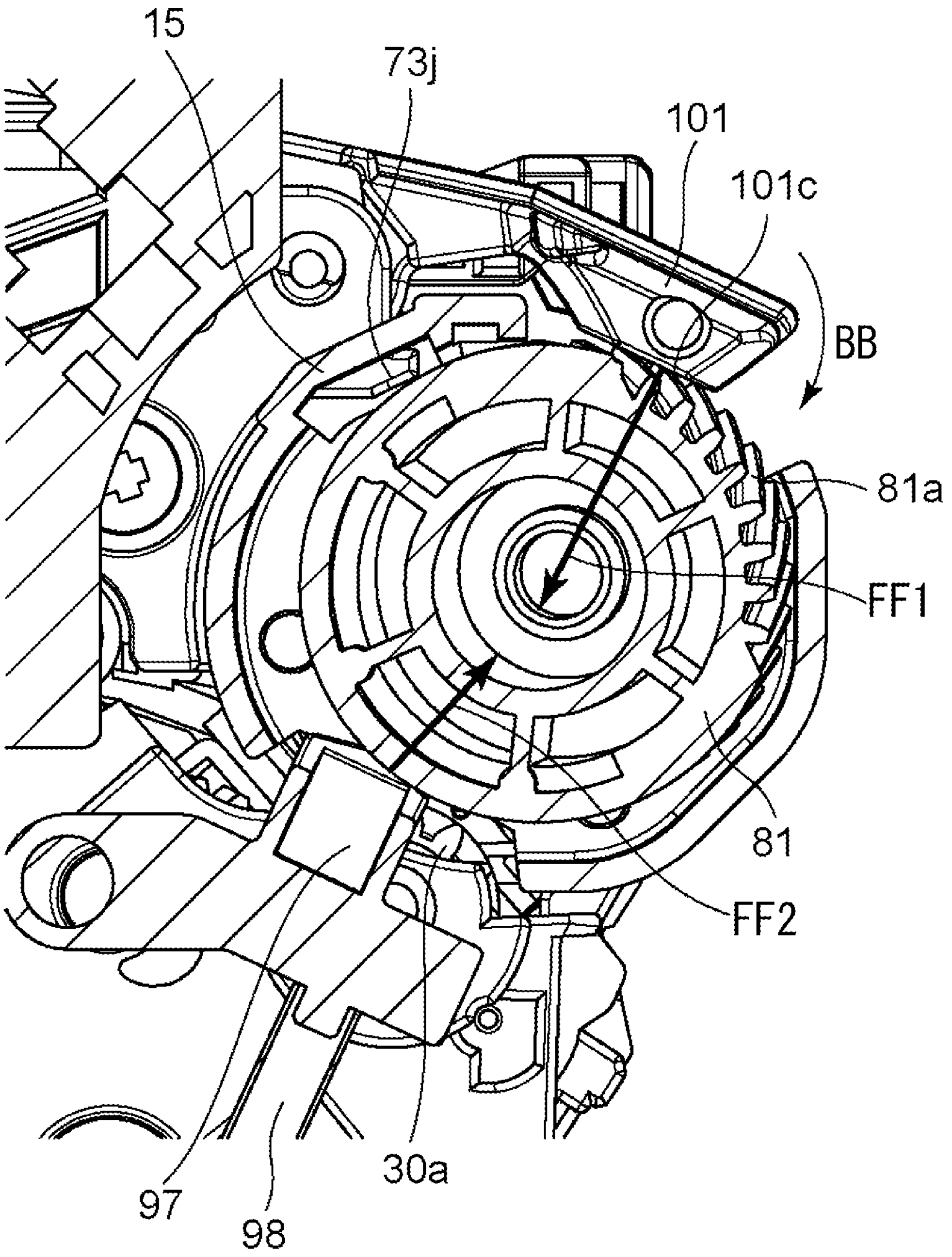
FIG. 16 is a cross-sectional view illustrating an inclining operation of the drive transmission member when the cartridge according to the Embodiment 1 is mounted.

Next, the operation of the control member when the cartridge is mounted will be described. FIG. 16 is a cross-sectional view illustrating a tilting operation of the drive transmission member when the cartridge is mounted.

As described in the foregoing, when the cartridge B is not mounted to the apparatus main assembly A, the drive transmission member 81 is kept tilted by the inclining member 97. The drive transmission member 81 receives the urging force FF2 by the inclining member 97. When the cartridge B is inserted in this state and the opening/closing door 13 is closed, the control portion 101*c* of the control member 101 comes into contact with the gear portion 81*a* of the drive transmission member 81, as shown in FIG. 16. Therefore, the drive transmission member 81 receives the urging force FF1 from the control portion 101*c*.

Therefore, the drive transmission member 81 receives the urging force FF1 from the control portion 101*c* in the direction of the arrow BB and receives the urging force FF2 from the inclining member 97. Here, FF1>FF2, and therefore, the inclination of the drive transmission member 81 becomes small. Therefore, the drive transmission member 81 moves so that the gear portion 81*a* of the drive transmission member 81 and the gear portion 30*a* of the developing roller gear 30 are brought into engagement with each other.

From the above, the process from the inclined state of the drive transmission member to the engagement of the coupling by mounting the cartridge in this embodiment is summarized as follows. First, the control member 101 of the cartridge B brings the gear portion 81*a* of the drive transmission member 81 into meshing engagement with the gear portion 30*a* of the developing roller gear 30. When the drive transmission member 81 is driven, the drive transmission member 81 moves to the drum 62 side due to the meshing force of the gear portion 30*a* of the developing roller gear 30 in the thrust direction. Further, the restricting portion 73*j* of the cartridge B regulates the inclination angle of the drive transmission member 81. By this, in the apparatus main assembly A in which the drive transmission member 81 is tilted, the misalignment between the couplings can be reduced so that both couplings can be engaged with each other.

<Removal of Cartridge>

The description will be made as to operation from the closed state to the open state of the opening/closing door 13 of the apparatus main assembly A. Part (a) of FIG. 13 shows a state in which the opening/closing door is closed, and part (b) of FIG. 13 shows a state in which the opening/closing door is opened.

First, the process of disengaging the coupling will be described. When the opening/closing door 13 is rotated and opened, the cylindrical cam 86 rotates by way of the cylindrical cam link 85. When the cylindrical cam 86 rotates, the slope portions 86*a*, 86*b*, and 86*c* of the cylindrical cam 86 slide along the slope portions 15*d*, 15*e*, and 15*f*, respectively, so that the cylindrical cam 86 moves toward the driving side (FIG. 5). By this movement, the coupled recess (63*b*) and projections (81*b*) are being released from each other. When the opening/closing door 13 is opened further, the coupling projection 63*b* and the recess portion 81*b* are disengaged from each other.

Next, the process from the disengagement of the coupling to the pull-out thereof will be described. As shown in part (b) of FIG. 13, when the opening/closing door 13 is opened, the drive transmission member 81 abuts against the projecting portion 93*c* of the second side plate 93 and tilts. Then, a gap is provided exceeding the engagement in the radial direction between the gear portion 81*a* of the drive transmission member 81 and the gear portion 30*a* of the developing roller gear 30. As a result, the meshing engagement between the gears 81*a* and 30*a* is smoothly released, when the cartridge B is pulled out from the apparatus main assembly A. That is, the cartridge B can be easily pulled out of the apparatus main assembly A.

<Structure of Cover Portion of Drive Transmission Member>

Figure 17:
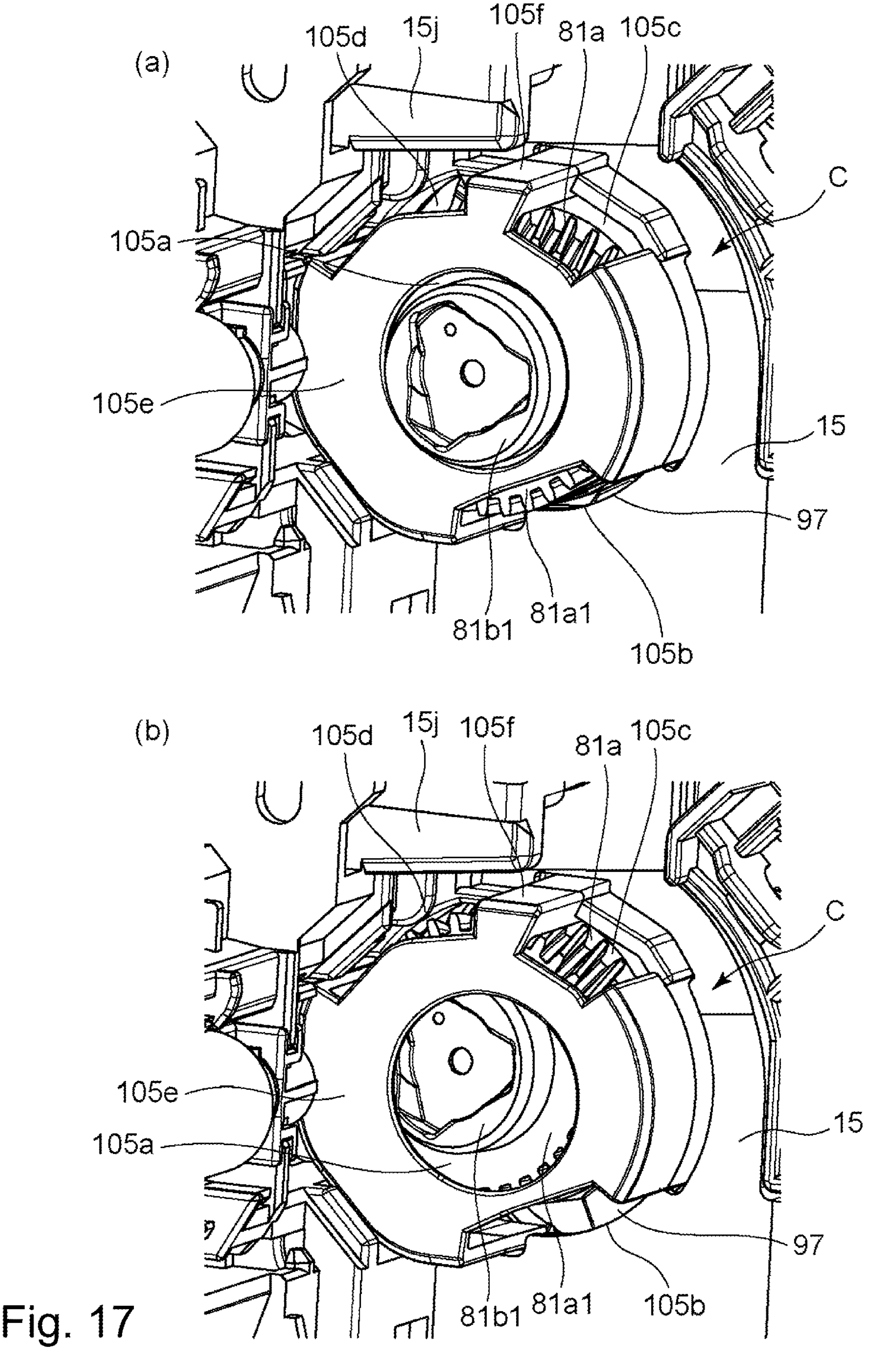
FIG. 17 is a perspective view illustrating the drive transmission member and the cover portion according to the Embodiment 1.
Figure 18:
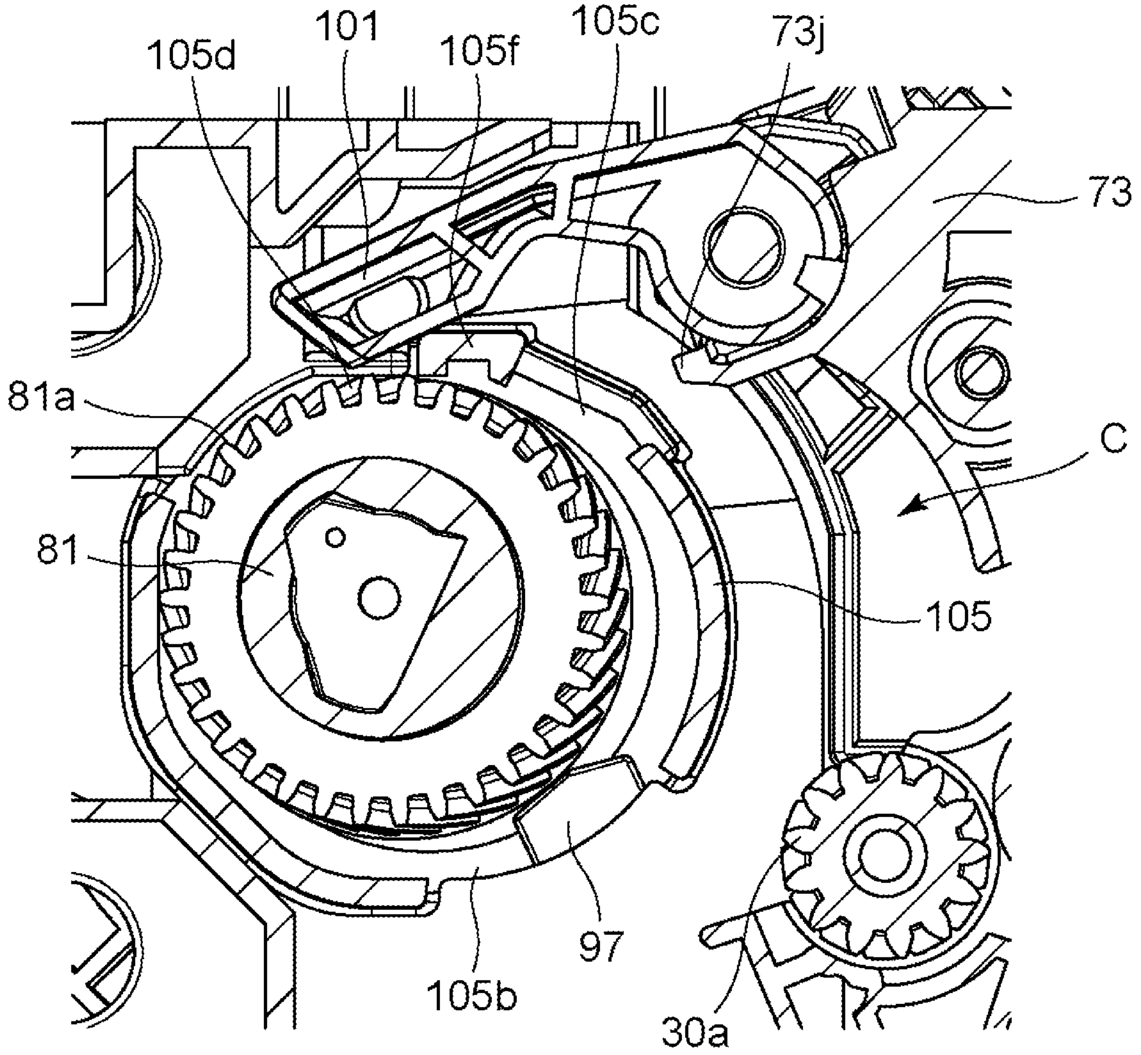
FIG. 18 is a cross-sectional view illustrating the operation of the control member when the cartridge is mounted and dismounted, according to the Embodiment 1.

A cover portion 105 which protects the drive transmission member 81 of the apparatus main assembly A will be described. Part (a) of FIG. 17 is a perspective view illustrating the drive transmission member and the cover portion when the coupling is engaged, and part (b) of FIG. 17 is a perspective view illustrating the drive transmission member and the cover portion in the state that the opening/closing door is opened. FIG. 18 is a cross-sectional view illustrating the operation of the control member when the cartridge is mounted and dismounted.

As shown in FIG. 17, the cover portion 105 which protects the drive transmission member 81 is provided on the first side plate 15 so as to cover the drive transmission member 81. The cover portion 105 has four openings.

First, a first opening 105*a* is placed at a position where the coupling cylindrical portion 81*i* of the drive transmission member 81 in the drive state projects, and at a non-driving side end surface 105*e* of the cover portion 105. Further, the position of the non-driving side end surface 105*e* of the cover portion 105 in the longitudinal direction is placed between the gear portion end surface 81*al* of the drive transmission member 81 and the drum bearing 73 in the driving state. Further, at the position, in the longitudinal direction, of the non-driving side end surface 105*e* of the cover portion 105, the free end portion 81*b*1 of the coupling recess projects in the driving state. Further, when the opening/closing door 13 is open, the drive transmission member 81 is in the retracted position, and therefore, the free end portion 81*b*1 of the coupling recess does not project beyond the non-driving side end surface 105*e* of the cover portion 105. Therefore, the cover portion 105 is placed so as not to interfere with the mounting of the cartridge B in the axial direction of the drum 62.

Next, the second opening 105*b* is placed at a position where the gear portion 81*a* of the drive transmission member 81 and the gear portion 30*a* of the developing roller gear 30 mesh with each other in the driving state, and below the side surface of the cover portion 105 on the upstream side in the mounting direction C. Further, the gear portion 81*a* of the inclined drive transmission member 81 with the opening/closing door 13 opened is inclined in the direction away from the gear portion 30*a* of the developing roller gear 30 by the inclining member 97, and therefore, the gear portion 81*a* is placed at a position away from the second opening 105*b*.

The third opening 105*c* is placed at the position of the restricting portion 73*j* of the cartridge B which regulates the inclination angle of the drive transmission member 81 at the time when the coupling is engaged, and on the upstream side, in the mounting direction C of the cartridge B, of the side surface of the cover portion 105. Further, since the gear portion 81*a* of the inclined drive transmission member 81 with the opening/closing door 13 opened is inclined toward the downstream side of the cartridge B mounting direction C by the inclining member 97, it is placed at the position away from the third opening 105*c*.

In addition, a fourth opening 105*d* is placed at a position where the control member 101 of the cartridge B and the gear portion 81*a* of the drive transmission member 81 are close to each other in the driving state, and the position is above the downstream side, in the mounting direction C of the cartridge B, of the side surface of the cover portion 105 (opposite side of the second opening).

In addition, as shown in FIG. 18, the cover portion 105 between the third opening 105*c* and the fourth opening 105*d* has a guide portion 105*f* which functions as a guide for operating the control member 101 when the cartridge B is mounted and dismounted. The cover portion 105*f* guides the free end portion of the control member 101 to guide the control member 101 toward the fourth opening 105*d*.

As described above, the space 87 of the cartridge B is for accepting the gear portion 81*a* and the cover portion 105 of the drive transmission member 81 inside the space 87 at the time when the cartridge B is mounted on the apparatus main assembly A. Because of the provision of the space 87, when the cartridge B is mounted to the apparatus main assembly A, the drive transmission member 81 does not interfere with the cartridge B, and the cartridge B is permitted to be mounted to the apparatus main assembly A.

As described above, in this embodiment, the cover portion 105 for protecting the drive transmission member 81 of the apparatus main assembly A is provided. Therefore, even when the process cartridge which can be mounted to and dismounted from the apparatus main assembly is removed from the apparatus main assembly, it is difficult for the user to touch the output coupling of the drive transmission member of the image forming apparatus and the lubricant applied to the output gear, thus improving the usability.

<Relationship Between Cartridge and Cover>

As described above, the cartridge B is provided with the space 87 so that the cartridge B does not interfere with the cover 105*a* or the drive transmission member 81 of the apparatus main assembly A when the cartridge is mounted to the apparatus main assembly A (FIG. 7). The space 87 is devised to match the shape of the cover portion 105*a* and the drive transmission member 81, and this will be described below.

Figure 20:
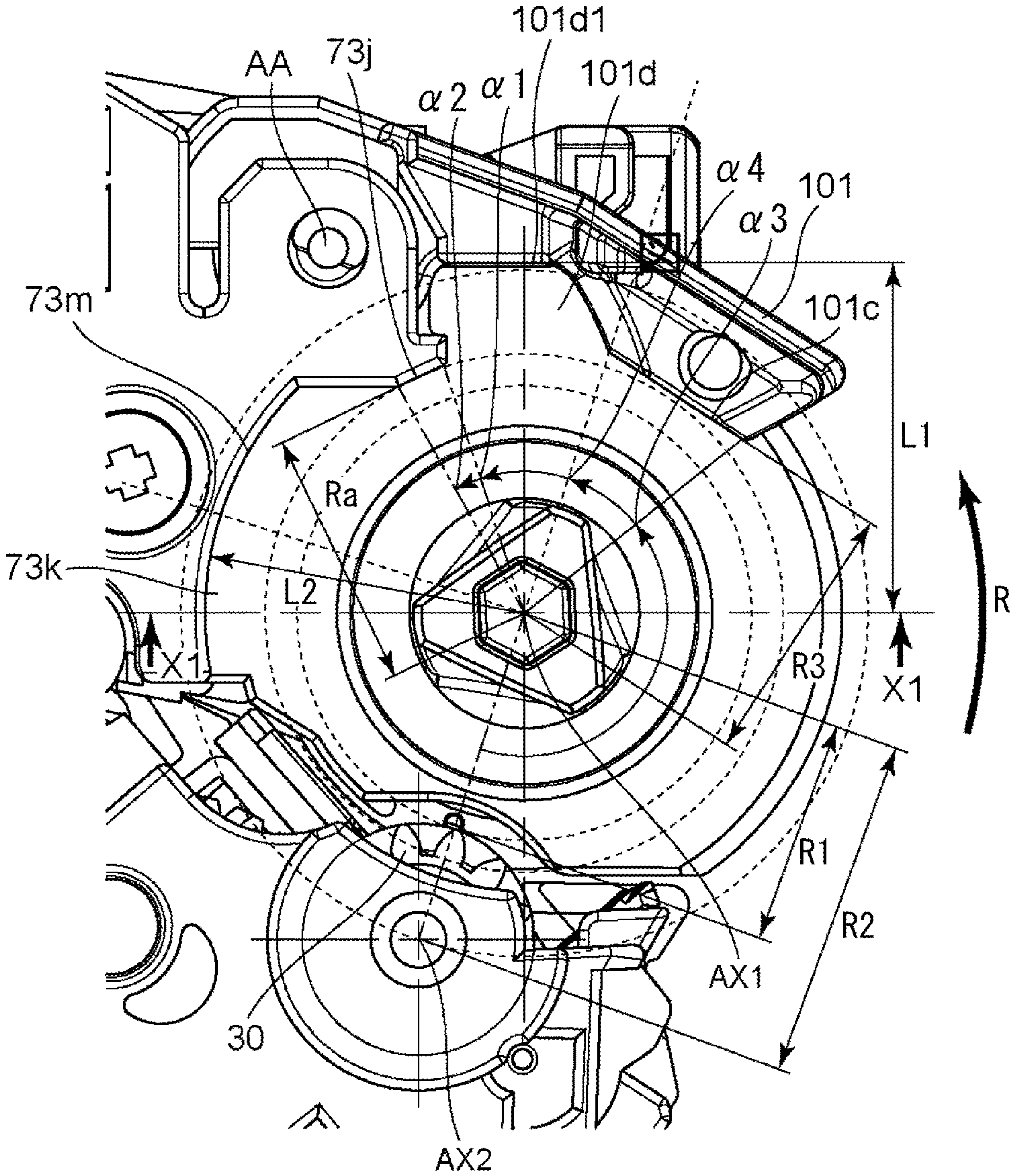
FIG. 20 is a side view of the cartridge according to the Embodiment 1.

FIG. 20 is a side view of the cartridge. FIG. 20 shows the driving side of the cartridge, which is a plane perpendicular to the axis of the drum 62. Further, FIG. 20 shows a state in which the control member 101 is located at the acting position.

The drum bearing 73 constituting the side surface of the cleaning frame 71 is provided with the regulating portion (projecting portion) 73*j* which projects outward in the axial direction. Further, the drum bearing 73 further is provided with a projecting portion 73*m* which projects outward in the axial direction. Here, the restricting portion 73*j* may be referred to as a first projecting portion, and the projecting portion 73*m* may be referred to as a second projecting portion.

Further, as described above, the regulation member 101 is provided in the neighborhood of the drum bearing 73.

On the other hand, the developing roller gear 32 is supported by the developing roller 30 supported by the developing frame 29.

These projecting portions (73*j*, 73*m*), the regulating member 101, and the developing roller gear 32 are outside the coupling projection 63*b* mounted to the drum 62, in the axial direction of the coupling projection 63*b* (FIG. 6). 7). The projecting portion (73*j*, 73*m*), the regulating member 101, and the developing roller gear 30 are arranged so as to surround the axis AX1. The vacant area surrounded by the projecting portion (73*j*, 73*m*), the regulating member 101, and the developing roller gear 30 is the space 87 (see FIGS. 7 and 25).

By determining the shapes and arrangements of the projecting portions (73*j*, 73*m*), the regulating member 101, and the developing roller gear 30 so as to satisfy specific conditions, the space 87 is made to match the shapes of the cover portion 105*a* and the drive transmission member 81. Hereinafter, detailed description will be made.

In the following description, polar coordinates (circular coordinates) on a plane perpendicular to the axis AX1 of the drum 62 will be used. In this polar coordinate system, the center of the drum 62 (axis line AX1) is the origin (pole), and the line extending from the center of the drum 62 (axis line AX1) to the center of the developing roller gear 30 (axis line AX2) is the ground line (pole line). The ground line can also be regarded as a line extending from the center of the drum 62 toward the center of the developing roller. The rotational direction R of the photosensitive member drum is the positive direction of the angular coordinates (deflection angle) 9. Unless otherwise specified, when the distance from the center of the photosensitive member drum (axis line AX1) is mentioned below, it is the distance in this polar coordinate system. That is, it is the distance measured along the direction perpendicular to the axis AX1 from the axis AX1 of the drum. In the polar coordinate system, the distance from the origin (drum axis AX1) may be referred to as radial coordinates r.

In FIG. 20, the angular coordinates of the upstream end of the surface portion of the regulation portion (first projecting portion) 73*j* in the rotational direction R are indicated by $\alpha 1$, and the angular coordinates of the downstream end are indicated by $\alpha 2$. The surface portion of the regulation portion 73 faces toward the center (AX2) of the drum 62.

Here, the preferable range of the angular coordinates of the regulation unit 73*j* is $190° < \alpha 1 < \alpha 2 < 280°$.

Further preferable conditions are $190° < \alpha 1 < 250°$, and $220° < \alpha 2 < 280°$.

In this Embodiment, $\alpha 1 = 216°$ and $\alpha 2 = 227°$, approximately.

Here, in the above polar coordinate system (FIG. 20), the distance from the center of the drum 62 (axis line AX1) to the surface portion of the regulation portion 73*j* is Ra, and the distance from the drum 62 (axis line AX1) to an addendum of the developing roller gear 30 is R1. The distance from the center of the drum 62 (axis line AX1) to the center of the developing roller gear 30 (axis line AX2) is R2.

Here, the relationships of R1<Ra<R2 are satisfied.

Summarizing the above, it is preferable that the surface portion of the restricting portion 73*j* is placed inside the region satisfying R1<r<R2, 190°<Θ<280° with respect to the radial coordinate r and the angular coordinate Θ in the polar coordinate system.

Further, in the rotational direction R of the drum 62, the control portion 101*c* of the control member 101 is placed at a position which is on the upstream side of the regulation portion 73*j* and which is on the downstream side of the developing roller gear 30. The control portion 101*c* is a part of the surface of the control member 101 and faces toward the axis AX1 of the drum 62.

In this embodiment, in the polar coordinate system, the angular coordinates of the downstream end of the control portion 101*c* are α4, and the angular coordinates of the upstream end are α3. Suitable ranges for the angular coordinates α3 and α4 are 110°<α3<α4<225°. That is, it is desirable that the control portion 101*c* is placed inside a range in which the angular coordinate Θ satisfies 110°≤Θ<225°. However, as described above, the control portion 101*c* is placed on the upstream side of the regulation unit 73*j* in the rotational direction R.

More specifically, the preferable conditions of α3 and α4 are as follows.

$$110° < \alpha 3 < 170°,$$

and $$170° < \alpha 4 < 225°.$$

In this embodiment,

α3=147° and α4=180°, approximately.

As for the angular coordinates α1 and α2 at both ends of the restricting portion 73*j* and the angular coordinates α3 and α4 at both ends of the control portion 101*c*, α3<α4<α1<α2 are satisfied.

Further, in the polar coordinate system (FIG. 20), the shortest distance R3 from the center of the drum 62 (axis line AX1) to the control portion 101*c*, is smaller than the distance R2 from the center of the drum 62 (axis line AX1) to the center of the developing roller gear 30 (axis line AX2). Further, R3 is larger than the distance R1 from the center of the drum 62 (axis line AX1) to the addendum of the developing roller gear 30. That is, the relationships of R1<R3<R2 are satisfied.

Further, it is desirable that the distance R3 from the center of the drum 62 (axis line AX1) to the control portion 101*c* is set slightly larger than the distance Ra from the center of the drum (axis line AX1) to the regulation portion 73*j*. That is, it is desirable to satisfy Ra<R3.

In the range from the angular coordinate α4 to the angular coordinate α1, the control member is provided with a recess (retracted portion) 101*d*. The recess 101*d* is a recess which is recessed so as to be away from the center of the drum. The distance from the center of the drum 62 (axis line AX1) to the surface 101*d*1 forming the recess 101*d* is L1. With respect to the distance Ra from the drum center (axis line AX1) to the projecting portion 73*j* and the distance R3 from the drum center (axis line AX1) to the control portion 101*c*, the distance L1 has a relationship of Ra<L1, R3<L1.

Further, in the rotational direction R, the second projecting portion 73*m* and a retracted portion 73*k* are provided at positions which are on the downstream side of the restricting portion 73*j* and which are on the upstream side of the developing roller gear 30. The surface of the second projecting portion 73*m* is placed more remote from the center of the drum (axis line AX1) than the surface of the restricting portion 73*j*. Here, the restricting portion 73*j* may be referred to as a first projecting portion to distinguish it from the second projecting portion 73*m*.

That is, the second projecting portion 73*m* is recessed toward the outside in the radial direction more than the regulating portion (first projecting portion) 73*k*. The retracted portion 73*k* is a space provided by a step between the restricting portion 73*j* and the second projecting portion 73*m*. On the side surface of the frame of the cartridge, the part where the projecting portion (73*j*, 73*m*) is not formed is the retracted portion 73*k*.

Here, in FIG. 20, the distance L2 from the axis AX1 of the drum 62 to the second projecting portion 73*m* is larger than the distance Ra from the axis AX1 to the projecting portion 73*j*. That is, the relationship is Ra<L2.

In summary, the retracted portion 73*k* is placed in at least a portion of the region where the angular coordinate Θ satisfies α2<Θ<360°, and the radial coordinate r satisfies Ra<r<R2, in the polar coordinate system.

Particularly, with respect to the angular coordinate Θ, it is preferable that the retracted portion 73*k* is provided over the entire range where 282°<Θ<297° is satisfied. The retracted portion 73*k* may be provided so as to exceed this range.

Figure 23:
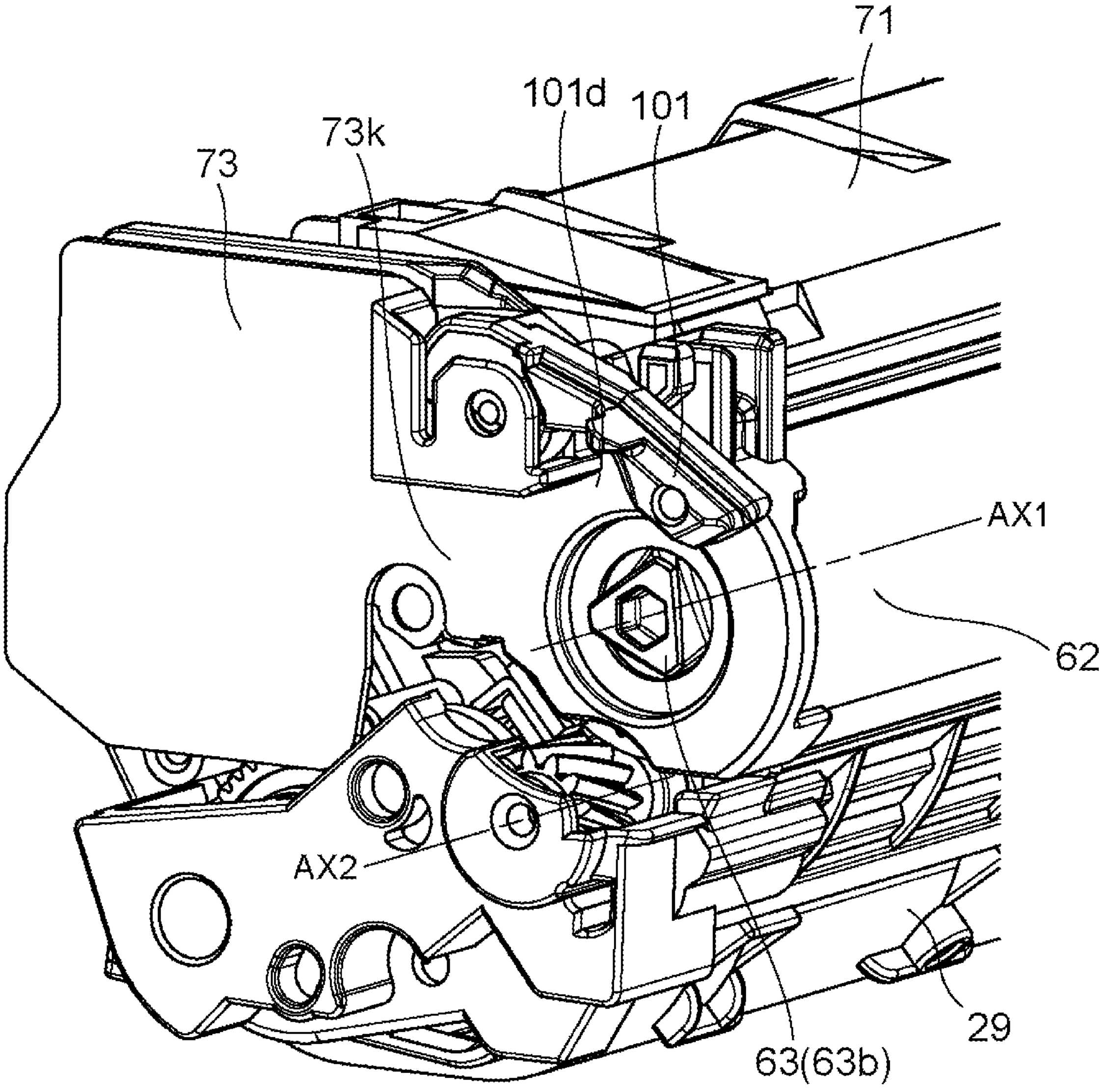
FIG. 23 is a perspective view of the cartridge according to the modified example.

In this embodiment, the second projecting portion 73*m* is provided so as to be in contact with the retracted portion 73*k*, but this is not always necessary. For example, if the retracted portion 73*k* is formed as shown in FIG. 23, the second projecting portion 73*m* may not be provided. FIG. 23 is a perspective view illustrating a modified example of the cartridge B in which the structure of the Embodiment 1 is partially modified.

Figure 21:
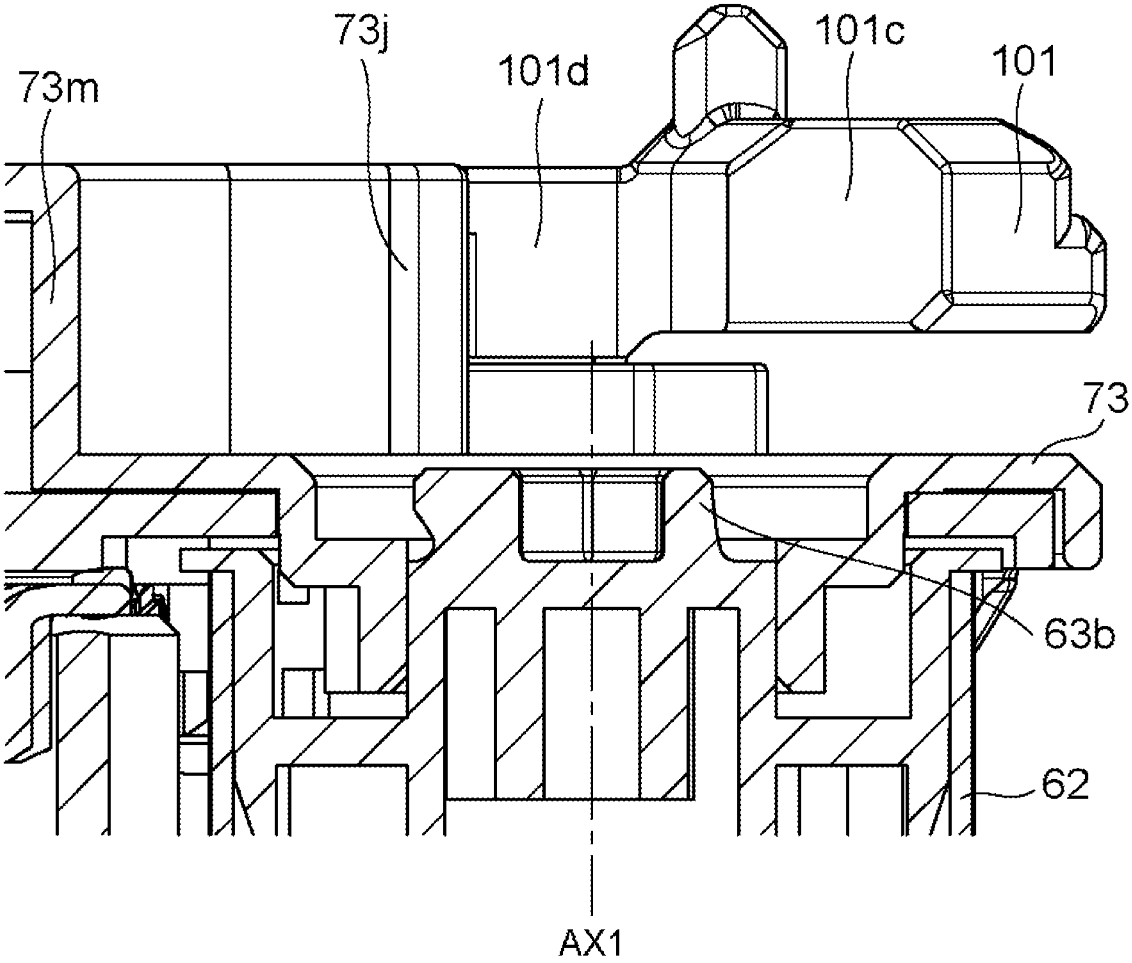
FIG. 21 is a sectional view of the cartridge according to the Embodiment 1.

As shown in FIG. 21, which is a sectional view taken along a line X1-X1 of FIG. 20, the restricting portion 101*c* and the projecting portion (73*j*, 73*m*) of the control member 101 are placed at positions outside the coupling projection 63*b* in the longitudinal direction.

As described above, the space 87 (FIG. 7) is formed around the axis A1 of the drum by being surrounded by the control member 101, the projecting portions (73*j*, 73*m*) and the developing roller gear 30. When the cartridge B is mounted to the apparatus main assembly A, the drive transmission member 81 and the cover portion 105 (see FIG. 17) which protects the drive transmission member 81 can enter the space 87.

Figure 24:
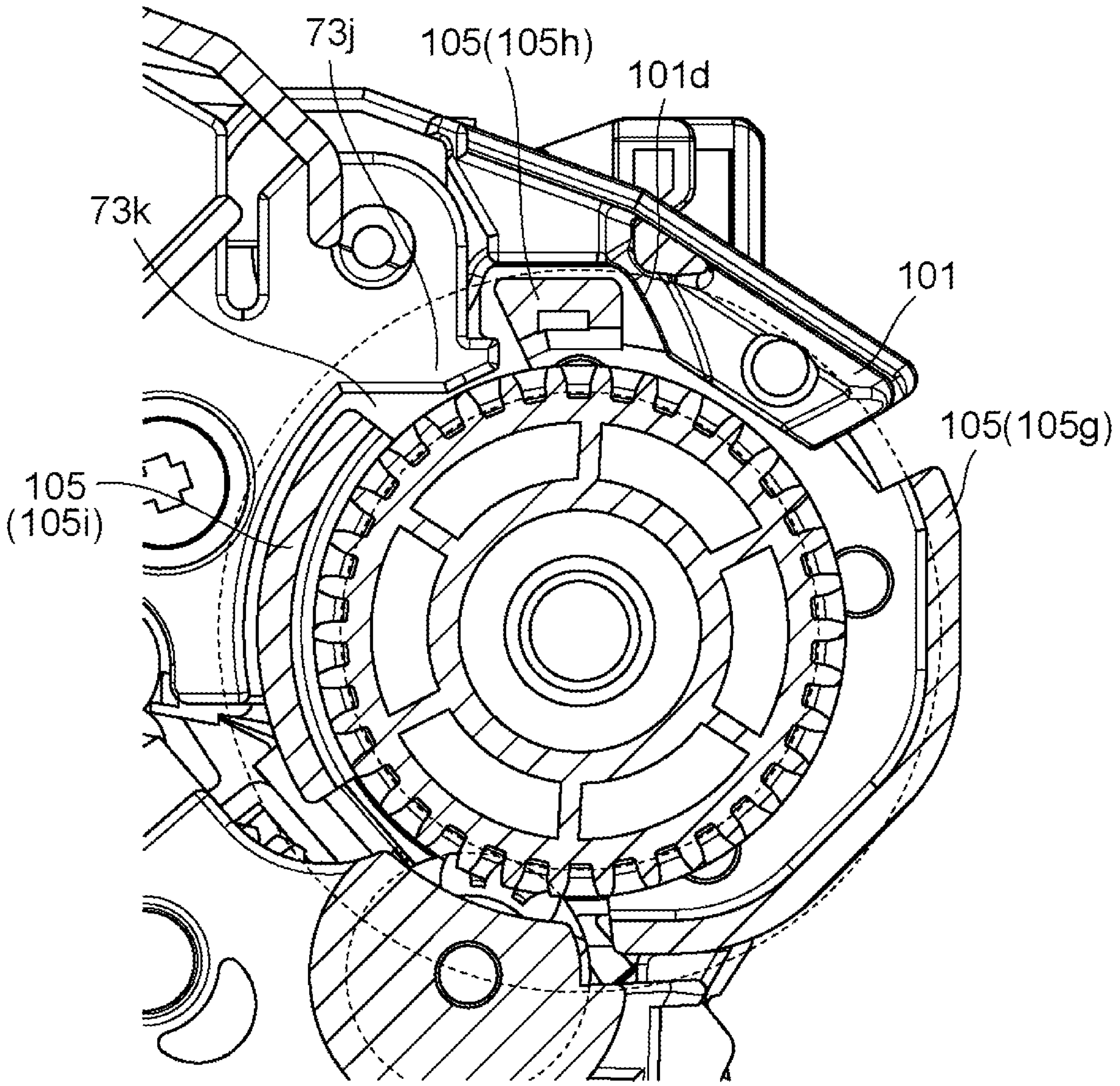
FIG. 24 is a sectional view of the cartridge and the image forming apparatus main assembly according to the Embodiment 1.
Figure 25:
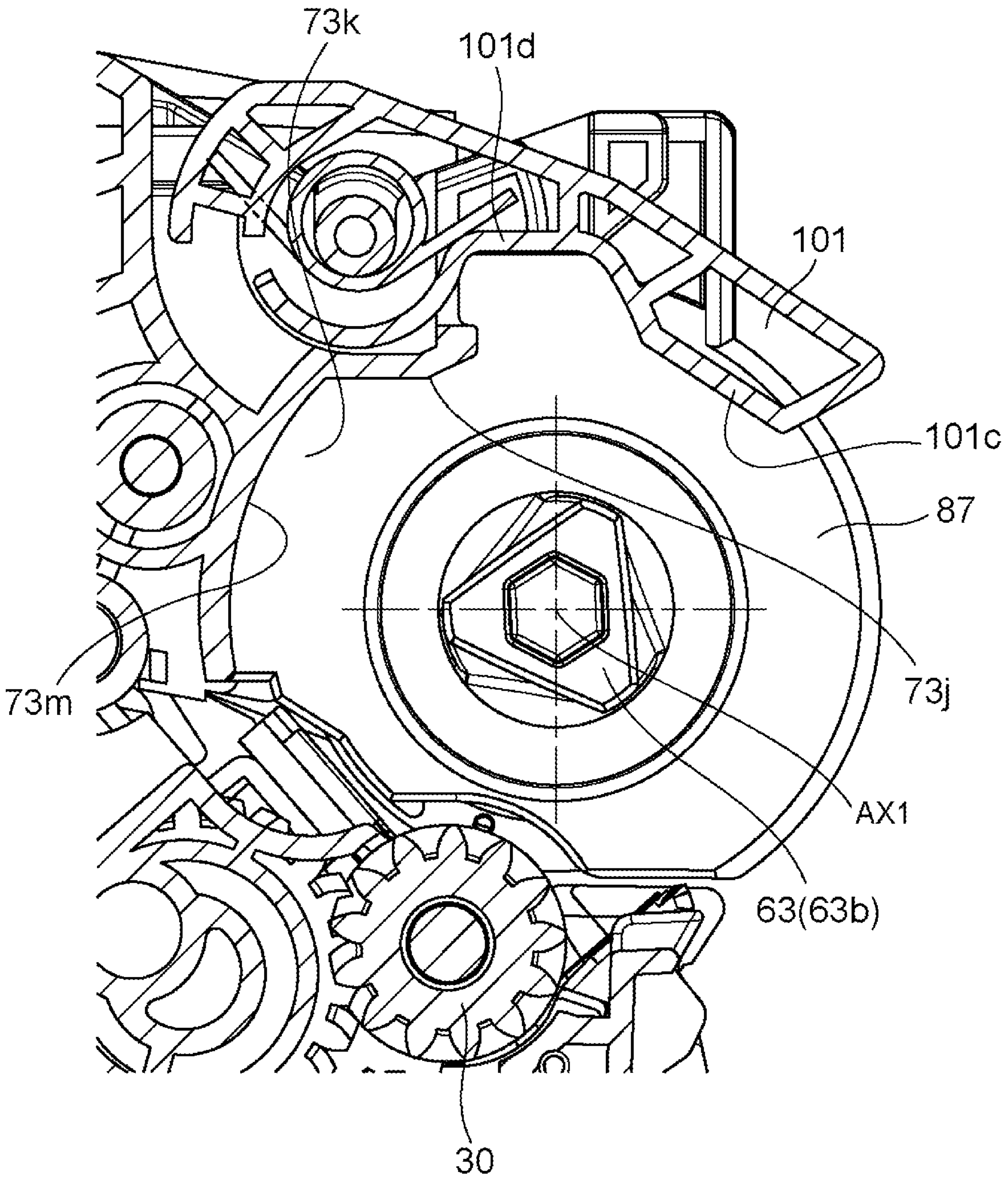
FIG. 25 is a cross-sectional view of the cartridge according to the Embodiment 1.

FIG. 24 shows a cross-sectional view of the cartridge and the apparatus main assembly in a state where the cartridge B is mounted on the apparatus main assembly A. Further, FIG. 25 shows a cross-sectional view of the cartridge in a state where the cartridge B is not mounted on the apparatus main assembly A. FIG. 25 is a cross-section along a plane perpendicular to the axis of the photosensitive member drum and passing through the developing roller gear 30.

As will be understood from FIG. 24, by providing the retracted portion 73*k* and the retracted portion 101*d* on the side surface of the cartridge, the interference between the cover portion and the cartridge can be avoided. Further, As will be understood from FIG. 25, the space 87 surrounded by the developing roller gear 30, the projecting portions (73*j*, 73*m*), and the control member 101 is formed around the axis AX of the photosensitive member drum. In particular, since the space 87 is expanded by the retracted portion 73*k* and the retracted portion 101*d*, the space 87 can be made larger than the cover portion 105. The cover portion 105 can be accommodated in the space 87, and the drive transmission member 81 and the cartridge B can be connected with each other.

As shown in FIG. 20, the space 87 is larger than a circle having a radius R1 centered on the axis AX1 of the drum 62.

The radius R1 is the distance from the axis A1 of the drum 62 to the addendum of the developing roller gear 30. That is, the inside of the circle having the radius R1 is a necessary region for accommodating the drive transmission member 81.

Further, the space 87 has parts expanded by the retracted portion 73*k* and the recess 101*d*. The cover portion 105 is accommodated in this area. As shown in FIG. 24, a portion 105*i* of the cover portion 105 is accommodated in the region corresponding to the retracted portion 73*k*. A portion 105*h* of the cover portion 105 is accommodated in the recess 101*d*.

Further, the space 87 extends to a region on the downstream side of the developing roller gear 30 and the upstream side of the control portion 101*c* in the rotational direction R of the drum 62. As shown in FIG. 24, a portion 105*g* of the cover portion 105 is accommodated in this area. It is desirable that a space 87 for accommodating the portion 105*g* exists at least in the entire area where the deflection coordinate Θ satisfies 63°<Θ<109°. In this embodiment, the space 87 is open without being closed in the region downstream of the developing roller gear 30 and upstream of the control portion 101*c*. That is, the drum bearing 73 does not have a component for closing the space 87 between the developing roller gear 30 and the control portion 101*c*.

In the region downstream of the developing roller gear 30 and upstream of the control portion 101*c*, the space 87 has a region in which the distance from the drum axis AX1 exceeds Ra (see FIG. 20).

According to this embodiment, the cover portion 105 can be accommodated in the space 87, and the drive transmission member 81 protected by the cover portion 105 can be reliably connected with the cartridge B.

As described above referring to FIG. 22, when the force F2 is applied to the control member 101, the control member 101 rotates around the axis AA in the direction of the arrow AB against the urging force of the urging spring 102 and can be moved to the non-acting position (retracted position). At this time, the distance R4 (FIG. 22) between the control portion 101*c* of the control member and the axis AX1 is larger than the distance R3 (FIG. 20) between the control portion 101*c* and the axis AX1 at the acting position. That is, the relationship is R3<R4.

By the movement of the control member 101 in this manner, the distance between the control portion 101*c* and the drum axis AX1 changes. The size of the space 87 also changes as the control member 101 moves.

Therefore, the space 87 does not necessarily have to be large enough to accommodate the drive transmission member 81 and the cover portion 105. That is, it is conceivable that a sufficient space 87 may not be formed before the cartridge B is mounted on the apparatus main assembly A.

In this case, Any structure may be employed if as the cartridge B is mounted to the main assembly A of the apparatus, the control member 101 is moved to the predetermined position by the main assembly A so that the control member 101 defines the space 87 sufficient to accommodate the cover portion 105. The predetermined position of the control member 101 is a position as shown in FIG. 22, 24, or 25. In this embodiment, the control member 101 is set to take the predetermined position (acting position) as shown in FIG. 22, 24 or 25 when the cartridge B is not mounted to the apparatus main assembly A, that is, the control member 101 is not subjected to an external force.

In this embodiment, the cover portion has four openings. However, these openings are not limited to such an example in the number, shape, and arrangement of the openings. For example, these openings may be connected, the number of openings may be increased, the shape of the openings may be changed, or the arrangement of the openings may be change.

Unless otherwise specified, the functions, materials, shapes, and relative arrangements of the components described in the embodiments described above are not intended to limit the scope of the present invention to them.

INDUSTRIAL APPLICABILITY

According to the present invention, an image forming apparatus such as an electrophotographic image forming apparatus and a process cartridge used for the image forming apparatus are provided.

The present invention is not limited to the above-described embodiments, and various modifications and modifications can be made without departing from the spirit and scope of the present invention. Therefore, the following claims are attached in order to publicize the scope of the present invention.

This application claims priority based on Japanese Patent Application No. 2019-180285 filed on Sep. 30, 2019, and all the contents thereof are incorporated herein by reference.

The invention claimed is:

1. A cartridge comprising:

a photosensitive drum rotatable about an axis of the photosensitive drum;

a developing roller configured to develop a latent image formed on the photosensitive drum;

a gear at least a part of which is uncovered to outside of the cartridge and faces the axis of the photosensitive drum, the gear positioned at a first side of the cartridge in an axial direction of the photosensitive drum; and a frame supporting the photosensitive drum and the developing roller, wherein the frame includes a first projecting portion and a second projecting portion at the first side of the cartridge, and the first projecting portion and the second projecting portion project away from a second side of the cartridge that is opposite to the first side, wherein the second projecting portion is positioned downstream of the first projecting portion and upstream of the gear in a rotational moving direction of the photosensitive drum, wherein the second projecting portion is positioned farther from the axis of the photosensitive drum than the first projecting portion is positioned from the axis of the photosensitive drum, and wherein, in a pole coordinate system in a plane perpendicular to the axis of the photosensitive drum, the pole coordinate system having a point of origin on the axis of the photosensitive drum, a ground line extending from the point of origin and passing through an axis of the gear, and a positive direction of an angle Θ being in the rotational moving direction of the photosensitive drum, where R1 is a distance from the axis of the photosensitive drum to a tip of a tooth of the gear when the tip of the tooth is a closest part of the gear to the axis of the photosensitive drum, and where R2 is a distance from the axis of the photosensitive drum to the axis of the gear:

a part of the first projecting portion that is closest to the axis of the photosensitive drum is positioned at the angle Θ such that 190°<Θ<280° in the pole coordinate system, and a distance Ra from the axis of the photosensitive drum to the closest part of the first projecting portion satisfies R1<Ra<R2, and a space bordered by the gear, the first projecting portion, and the second projecting portion is provided at the first side of the cartridge, with a circle contained in the space having a center on the axis of the photosensitive drum and a radius equal to R1.

2. A cartridge according to claim 1, wherein the frame includes (i) a first frame supporting the photosensitive drum and provided with the first projecting portion and the second projecting portion, and (ii) a second frame supporting the developing roller.

3. A cartridge according to claim 1, further comprising a drum coupling positioned at the first side of the cartridge coaxially with the photosensitive drum, wherein the drum coupling is operatively connected to the photosensitive drum.

4. A cartridge according to claim 1, wherein the gear is operatively connected to the developing roller.

5. A cartridge according to claim 1, wherein the gear is coaxial with the developing roller.

6. A cartridge comprising:

a photosensitive drum rotatable about an axis of the photosensitive drum;

a developing roller configured to develop a latent image formed on the photosensitive drum;

a gear at least a part of which is uncovered to outside of the cartridge and faces the axis of the photosensitive drum, the gear positioned at a first side of the cartridge in an axial direction of the photosensitive drum; and a frame supporting the photosensitive drum and the developing roller, the frame including a projecting portion at the first side of the cartridge, wherein the projecting portion projects away from a second side of the cartridge that is opposite to the first side, wherein, in a pole coordinate system in a plane perpendicular to the axis, the pole coordinate system having a point of origin on the axis of the photosensitive drum, a ground line extending from the point of origin and passing through an axis of the gear, and a positive direction of an angle Θ being in a rotational moving direction of the photosensitive drum, where R1 is a distance from the axis of the photosensitive drum to a tip of a tooth of the gear when the tip of the tooth is a closest part of the gear to the axis of the photosensitive drum, and R2 is a distance from the axis of the photosensitive drum to the axis of the gear:

(i) a part of the projecting portion that is closest to the axis of the photosensitive drum is positioned at the angle Θ such that $190° < \Theta < 280°$, (ii) the frame includes a region in which no part of the projecting portion exists in a region downstream of the projecting portion and upstream of the gear in the rotational moving direction of the photosensitive drum, (iii) a distance Ra from the axis of the photosensitive drum to the closest part of the projecting portion satisfies $R1 < Ra < R2$, and (iv) a circle is contained in the space region in which no part of the projecting portion existst, the circle having a center on the axis of the photosensitive drum and a radius equal to R1.

7. A cartridge according to claim 6, further comprising a drum coupling positioned at the first side of the cartridge coaxially with the photosensitive drum, the coupling being operatively connected to the photosensitive drum.

8. A cartridge according to claim 6, wherein the gear is operatively connected to the developing roller.

9. A cartridge according to claim 6, wherein the gear is coaxial with the developing roller.

10. A cartridge according to claim 6, wherein the frame includes (i) a first frame supporting the photosensitive drum and provided with the projecting portion, and (ii) a second frame supporting the developing roller.

* * * * *